US011593292B2

(12) United States Patent
Connor et al.

(10) Patent No.: US 11,593,292 B2
(45) Date of Patent: *Feb. 28, 2023

(54) MANY-TO-MANY PCIE SWITCH

(71) Applicant: INTEL CORPORATION, Santa Clara, CA (US)

(72) Inventors: Patrick Connor, Beaverton, OR (US); Matthew A. Jared, Hillsboro, OR (US); Duke C. Hong, Hillsboro, OR (US); Elizabeth M. Kappler, Hillsboro, OR (US); Chris Pavlas, Hillsboro, OR (US); Scott P. Dubal, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 157 days.

This patent is subject to a terminal disclaimer.

(21) Appl. No.: 16/894,437

(22) Filed: Jun. 5, 2020

(65) Prior Publication Data

US 2020/0301864 A1 Sep. 24, 2020

Related U.S. Application Data

(63) Continuation of application No. 14/014,775, filed on Aug. 30, 2013, now Pat. No. 10,684,973.

(51) Int. Cl.
*G06F 13/00* (2006.01)
*G06F 13/40* (2006.01)

(52) U.S. Cl.
CPC .............................. *G06F 13/4022* (2013.01)

(58) Field of Classification Search
None
See application file for complete search history.

(56) References Cited

U.S. PATENT DOCUMENTS

| 3,749,845 A | 7/1973 | Fraser |
| 5,243,699 A | 9/1993 | Nickolls et al. |

(Continued)

FOREIGN PATENT DOCUMENTS

| CN | 102833332 A | 12/2012 |
| EP | 1367799 A2 | 12/2003 |
| WO | 2006055494 A1 | 5/2006 |

OTHER PUBLICATIONS

Bilic et al., "Deferred Segmentation for Wire-Speed Transmission of Large TCP Frames over Standard GbE Networks", 2001, pp. 81-85.

(Continued)

*Primary Examiner* — Henry Tsai
*Assistant Examiner* — Dean Phan
(74) *Attorney, Agent, or Firm* — Compass IP Law PC

(57) ABSTRACT

Methods, apparatus, and computer platforms and architectures employing many-to-many and many-to-one peripheral switches. The methods and apparatus may be implemented on computer platforms having multiple nodes, such as those employing a Non-uniform Memory Access (NUMA) architecture, wherein each node comprises a plurality of components including a processor having at least one level of memory cache and being operatively coupled to system memory and operatively coupled to a many-to-many peripheral switch that includes a plurality of downstream ports to which NICs and/or peripheral expansion slots are operatively coupled, or a many-to-one switch that enables a peripheral device to be shared by multiple nodes. During operation, packets are received at the NICs and DMA memory writes are initiated using memory write transactions identifying a destination memory address. The many-to-many and many-to-one peripheral switches forwards the transaction packets internally within the switch based on the destination address such that the packets are forwarded to a (Continued)

node via which the memory address can be accessed. The platform architectures may also be configured to support migration operations in response to failure or replacement of a node.

17 Claims, 19 Drawing Sheets

(56) References Cited

U.S. PATENT DOCUMENTS

| | | | |
|---|---|---|---|
| 5,296,935 A | 3/1994 | Bresler |
| 5,398,245 A | 3/1995 | Harriman, Jr. |
| 5,781,549 A | 7/1998 | Dai |
| 5,937,169 A | 8/1999 | Connery et al. |
| 6,021,263 A | 2/2000 | Kujoory et al. |
| 6,246,683 B1 | 6/2001 | Connery et al. |
| 6,247,060 B1 | 6/2001 | Boucher et al. |
| 6,295,280 B1 | 9/2001 | Oh |
| 6,308,282 B1 | 10/2001 | Huang et al. |
| 6,389,468 B1 | 5/2002 | Muller et al. |
| 6,453,360 B1 | 9/2002 | Muller et al. |
| 6,483,804 B1 | 11/2002 | Muller et al. |
| 6,484,209 B1 | 11/2002 | Momirov |
| 6,564,267 B1 | 5/2003 | Lindsay |
| 6,618,793 B2 | 9/2003 | Rozario et al. |
| 6,625,689 B2 | 9/2003 | Narad et al. |
| 6,633,576 B1 | 10/2003 | Melaragni et al. |
| 6,633,835 B1 | 10/2003 | Moran et al. |
| 6,650,640 B1 | 11/2003 | Muller et al. |
| 6,658,480 B2 | 12/2003 | Boucher et al. |
| 6,662,276 B2 | 12/2003 | Schoinas |
| 6,665,495 B1 | 12/2003 | Miles et al. |
| 6,665,755 B2 | 12/2003 | Modelski et al. |
| 6,683,873 B1 | 1/2004 | Kwok et al. |
| 6,687,905 B1 | 2/2004 | Day et al. |
| 6,708,292 B1 | 3/2004 | Mangasarian |
| 6,715,005 B1 | 3/2004 | Rodriguez et al. |
| 6,718,326 B2 | 4/2004 | Uga et al. |
| 6,728,265 B1 | 4/2004 | Yavatkar et al. |
| 6,804,241 B2 | 10/2004 | Schwartz et al. |
| 6,816,455 B2 | 11/2004 | Goldberg et al. |
| 6,934,296 B2 | 8/2005 | Shimojo |
| 6,956,853 B1 | 10/2005 | Connery et al. |
| 6,957,281 B2 | 10/2005 | Mann et al. |
| 6,968,358 B2 | 11/2005 | Freimuth et al. |
| 6,973,040 B1 | 12/2005 | Ricciulli |
| 6,981,074 B2 | 12/2005 | Oner et al. |
| 7,012,919 B1 | 3/2006 | So et al. |
| 7,039,061 B2 | 5/2006 | Connor et al. |
| 7,043,494 B1 | 5/2006 | Joshi et al. |
| 7,080,308 B2 | 7/2006 | Schroeder |
| 7,162,740 B2 | 1/2007 | Eastlake et al. |
| 7,177,956 B2 | 2/2007 | Mann et al. |
| 7,219,228 B2 | 5/2007 | Lin |
| 7,404,040 B2 | 7/2008 | Ronciak et al. |
| 7,480,303 B1 | 1/2009 | Ngai |
| 7,586,925 B2 | 9/2009 | Smith et al. |
| 7,620,046 B2 | 11/2009 | Ronciak et al. |
| 7,639,624 B2 | 12/2009 | Mcgee et al. |
| 7,693,045 B2 | 4/2010 | Mcgee et al. |
| 7,936,755 B2 | 5/2011 | Mann et al. |
| 7,944,828 B2 | 5/2011 | Ronciak et al. |
| 8,098,676 B2 | 1/2012 | Connor |
| 8,134,928 B1 | 3/2012 | Manickavasagam et al. |
| 8,438,284 B2 | 5/2013 | Horman et al. |
| 8,694,618 B2 | 4/2014 | Mugundan et al. |
| 9,047,417 B2 | 6/2015 | Conner et al. |
| 9,146,890 B1* | 9/2015 | Brown ............... G06F 13/4022 |
| 2001/0025315 A1 | 9/2001 | Jolitz |
| 2001/0037397 A1 | 11/2001 | Boucher et al. |
| 2001/0048681 A1 | 12/2001 | Bilic et al. |
| 2002/0057651 A1 | 5/2002 | Roberts |
| 2002/0073216 A1 | 6/2002 | Gaur |
| 2002/0110136 A1 | 8/2002 | Wakai et al. |
| 2002/0126711 A1 | 9/2002 | Robinett et al. |
| 2002/0144004 A1 | 10/2002 | Gaur et al. |
| 2002/0147851 A1 | 10/2002 | Morimura et al. |
| 2002/0181506 A1 | 12/2002 | Loguinov |
| 2003/0007469 A1 | 1/2003 | Daley et al. |
| 2003/0043810 A1 | 3/2003 | Boduch et al. |
| 2003/0065889 A1 | 4/2003 | Kamitani et al. |
| 2003/0093645 A1 | 5/2003 | Wong et al. |
| 2003/0095559 A1 | 5/2003 | Sano et al. |
| 2003/0108044 A1 | 6/2003 | Hendel |
| 2003/0126233 A1 | 7/2003 | Bryers et al. |
| 2003/0226032 A1 | 12/2003 | Robert |
| 2003/0227937 A1 | 12/2003 | Abrol et al. |
| 2003/0231657 A1 | 12/2003 | Poon et al. |
| 2003/0236815 A1 | 12/2003 | Brenner et al. |
| 2004/0013117 A1 | 1/2004 | Hendel et al. |
| 2004/0030757 A1 | 2/2004 | Pandya |
| 2004/0032829 A1 | 2/2004 | Bonn |
| 2004/0062245 A1 | 4/2004 | Sharp et al. |
| 2004/0090988 A1 | 5/2004 | Masputra et al. |
| 2004/0100952 A1 | 5/2004 | Boucher et al. |
| 2004/0151176 A1 | 8/2004 | Burton et al. |
| 2004/0151177 A1 | 8/2004 | Burton et al. |
| 2004/0208174 A1 | 10/2004 | Burton et al. |
| 2004/0213284 A1 | 10/2004 | Clarke et al. |
| 2005/0060445 A1 | 3/2005 | Beukema et al. |
| 2005/0204058 A1 | 9/2005 | Philbrick et al. |
| 2005/0249228 A1 | 11/2005 | Cornett |
| 2006/0004933 A1 | 1/2006 | Sen et al. |
| 2006/0031474 A1 | 2/2006 | Cornett |
| 2006/0064508 A1 | 3/2006 | Panwar et al. |
| 2006/0104303 A1 | 5/2006 | Makineni et al. |
| 2006/0206489 A1 | 9/2006 | Finnie et al. |
| 2006/0259656 A1 | 11/2006 | Sullivan |
| 2007/0064737 A1 | 3/2007 | Williams |
| 2007/0097950 A1 | 5/2007 | Boyd et al. |
| 2007/0174733 A1 | 7/2007 | Boyd et al. |
| 2008/0052443 A1 | 2/2008 | Cassiday et al. |
| 2008/0137676 A1* | 6/2008 | Boyd ..................... H04L 49/25 370/419 |
| 2008/0148295 A1* | 6/2008 | Freimuth ............. G06F 9/4856 719/324 |
| 2009/0028152 A1 | 1/2009 | Shimonishi |
| 2009/0154459 A1 | 6/2009 | Husak et al. |
| 2009/0164694 A1* | 6/2009 | Talayco ............. G06F 13/4022 710/316 |
| 2010/0020818 A1 | 1/2010 | Cardona et al. |
| 2010/0217949 A1 | 8/2010 | Schopp et al. |
| 2010/0254096 A1 | 10/2010 | Kim et al. |
| 2011/0010481 A1* | 1/2011 | Hamadani ........... G06F 13/4022 710/308 |
| 2011/0131328 A1 | 6/2011 | Horman et al. |
| 2011/0208871 A1 | 8/2011 | Mann et al. |
| 2011/0208874 A1 | 8/2011 | Mann et al. |
| 2011/0320759 A1 | 12/2011 | Craddock et al. |
| 2012/0072624 A1 | 3/2012 | Droux et al. |
| 2012/0243550 A1 | 9/2012 | Connor |
| 2012/0265801 A1 | 10/2012 | Mugundan et al. |
| 2013/0055270 A1 | 2/2013 | Dabagh et al. |
| 2013/0227219 A1 | 8/2013 | Ueki et al. |
| 2014/0029617 A1 | 1/2014 | Wang et al. |
| 2014/0115223 A1* | 4/2014 | Guddeti ................... G06F 13/14 710/314 |

OTHER PUBLICATIONS

Brafen, R., "Requirements for Internet Hosts—Communication Layers", Oct. 1989, 117 pages.

DAEMON9, "Project Neptune", Phrack Magazine, vol. 7, Issue 48, file 13 of 18, Jul. 1996, 13 pages.

Gallatin, Drew, "Zero Copy Sockets and NFS Patches for FreeBSD", retrieved from on Feb. 5, 2013, pp. 1-11.

Girouard, Janice M., "Patch for Common Networking Error Messages", retrieved from on Feb. 5, 2013, pp. 1-26.

Harvard Law, "RSS 2.0 Specification", retrieved from , Jul. 15, 2003, 6 pages.

IEEE Computer Society, "Amendment to Carrier Sense Multiple Access with Collision Detection (CSMA/CD) Access Method and

(56) References Cited

OTHER PUBLICATIONS

Physical Layer Specifications—Aggregation of Multiple Link Segments", IEEE Std 802.3ad-2000, Mar. 30, 2000, 184 pages.
Intel®, "Intel® IXP2400 Network Processor", Hardware Reference Manual, Nov. 2003, 229 pages.
Intel®, "Interrupt Moderation Using Intel® GbE Controllers", Revision 1.2, Apr. 2007, 19 pages.
International Preliminary Report on Patentability received for PCT Patent Application No. PCT/US2005/041195, dated May 22, 2007, 6 pages.
International Preliminary Report on Patentability received for PCT Patent Application No. PCT/US2005/044771, dated Jun. 28, 2007, 8 pages.
International Search Report and Written Opinion for PCT Patent Application No. PCT/U52005/041195, dated Mar. 21, 2006, 7 Pages.
International Search Report and Written opinion received for PCT Patent Application No. PCT/US2005/044771, dated May 8, 2006, 11 pages.
Lemon, Jonathan, "Resisting SYN Flood DoS Attacks with a SYN Cache", FreeBSD Project, 2002, 10 pages.
Marc, "Tcp Syn Cache Cleanup Code for Sc->Sc_So", retrieved from on Feb. 5, 2013, pp. 1-6.
McAfee, "FreeBSD/Linux Kernel Cross Reference", retrieved from on Feb. 5, 2013, pp. 1-24.
Merry, Kenneth D.,"Zero Copy Sockets and NFS Code for FreeBSD", retrieved from , Jun. 16, 2000, pp. 1-7.
Microsoft Corporation, "Scalable Networking: Eliminating the Receive Processing Bottleneck—Introducing RSS", WinHEC 2004 Version, Apr. 14, 2004, pp. 1-17.
Minturn et al., "Addressing TCP/IP Processing Challenges Using the IA and IXP Processors", Communications Processing, Intel Technology Journal, vol. 07, Issue 04, Nov. 14, 2003, pp. 39-50.
Office Action received for Chinese Patent Application No. 201410437326.0, dated May 3, 2017, 8 pages of Chinese Office Action Only.
Postel, Jon, "Transmission Control Protocol", DARPA Internet Program Protocol Specification, RFC: 793, Sep. 1981, 89 pages.
Rütsche, Erich, "The Architecture of a GB/s Multimedia Protocol Adapter", ACM SIGCOMM, Computer Communication Review, vol. 23, No. 3, Jul. 1993, 10 pages.
Sapuntzakis et al., "The Case for RDMA", Cisco Systems, Dec. 2000, 12 pages.
Steenbergen, Richard A., "Understanding Modern Denial of Service", 2001, 10 pages.
Tech-Net, "Tcp Syn Cache Clean Up Code for Sc->Sc_So", retrieved from , Aug. 21, 1999, 1 page.
The Regents of the University of California, "FreeBSD/Linux Kernel Cross Reference", retrieved from on Feb. 5, 2013, pp. 1-9.
Wadge, Wallace, "Achieving Gigabit Performance on Programmable Ethernet Network Interface Cards", May 29, 2001, 9 pages.
Wikipedia, "OSI Model", retrieved from on Feb. 5, 2013, pp. 1-8.
www.wikipedia.com, Integrated Circuit, Dec. 2004, pp. 1-6 (Year: 2004).
Zec et al., "Estimating the Impact of Interrupt Coalescing Delays on Steady State TCP Throughput", Appeared in Proceedings of the 10th SoftCOM 2002 Conference, 2002, pp. 1-6.

\* cited by examiner

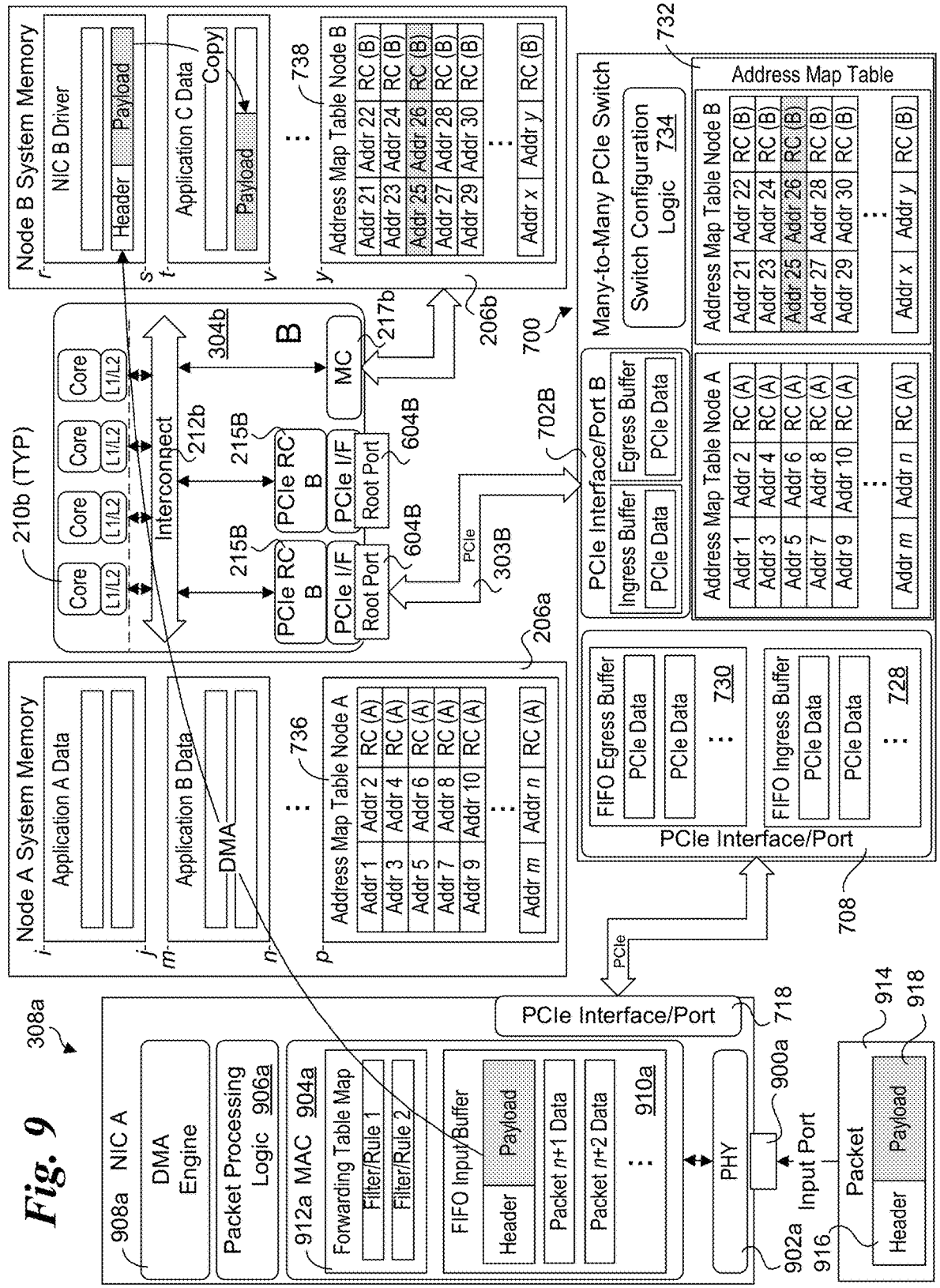

US 11,593,292 B2

MANY-TO-MANY PCIE SWITCH

CROSS REFERENCE TO RELATED APPLICATION

This application is a continuation of U.S. patent application Ser. No. 14/014,775, filed Aug. 30, 2013 and entitled "NUMA NODE PERIPHERAL SWITCH," which is incorporated by reference in its entirety for all purposes.

FIELD OF THE INVENTION

The field of invention relates generally to computer architectures and, more specifically but not exclusively relates to a methods, apparatus, and computer platforms and architectures employing many-to-many and many-to-one peripheral switches internally within a computer system.

BACKGROUND INFORMATION

Access to computer networks has become a ubiquitous part of today's computer usage. Whether accessing a Local Area Network (LAN) in an enterprise environment to access shared network resources, or accessing the Internet via the LAN or other access point, it seems users are always logged on to at least one service that is accessed via a computer network. Moreover, the rapid expansion of cloud-based services has lead to even further usage of computer networks, and these services are forecast to become ever-more prevalent.

Expansion of network usage, particularly via cloud-based services, as been facilitated via substantial increases in network bandwidths and processor capabilities. For example, broadband network backbones typically support bandwidths of 10 Gigabits per second (Gbps) or more, while the standard for today's personal computers is a network interface designed to support a 1 Gbps Ethernet link. On the processor side, processors capabilities have been increased through both faster clock rates and use of more than one processor core. For instance, today's PCs typically employ a dual-core processor or a quad-core processor, while servers may employ processors with even more cores. For some classes of servers, it is common to employ multiple processors to enhance performance. In addition, it is envisioned that much if not most of the future processor performance increases will result from architectures employing greater numbers of cores, and that future servers may employ greater numbers of processors.

In computer systems, network access is typically facilitated through use of a Network Interface Controller (NIC), such as an Ethernet NIC. In recent years, server NICs have been designed to support for many optimizations for multi-core, multi-processor platform architectures. These optimizations include Receive Side Scaling (RSS) and Application Targeted Routing (ATR). These optimizations were designed around the prior art front-side bus (FSB) platform architecture, as illustrated in FIG. 1.

In further detail, FIG. 1 depicts a simplified front-side bus architecture diagram for a symmetric multiprocessing (SMP) platform. The architecture includes multiple processors 100 coupled to a front-side bus (FSB) 102. Also coupled to FSB 102 is a North bridge 104, which in turn is coupled to memory 106, a high-bandwidth Input/Output (I/O) interface (as depicted by a Platform Component Interconnect Express (PCIe) x8 interface 108), and a South bridge 110. South bridge 110 was typically configured to interface with various platform I/O devices and peripherals, such as depicted by PCIe x4 interfaces 112 and 114.

Under this legacy architecture the network interface controllers were attached via a PCIe interface to either North bridge 104 or South bridge 110, as depicted by NICs 116 and 118. In either case, the NICs communicated to a uniform memory 106 via North bridge 104. All processor 100 accesses to memory 106 were also via North bridge 104. Implementation of RSS and ATR distributed network workloads across cores and, although cache impacts were considered, the primary goal was workload distribution.

Processor architectures have also changed in recent years, moving from discrete components toward a highly integrated approach. For example, for many years, the North-bridge, South-bridge architecture was implemented using physically separate chips for North bridge 104 and South bridge 110 using wired (e.g., board traces) interconnects for the FSB and the interconnect between the North and South bridges. Under a typical highly integrated design employed by today's processors, a processor employing one or more processor cores and logic providing functionality somewhat similar to a North bridge and South bridge are integrated on a single chip with corresponding interconnect wiring embedded in the chip. Under this highly integrated architecture, the processor cores are referred to as the "core" and the rest of the processor circuitry is referred to as the "uncore."

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified:

FIG. 9 is schematic diagram illustrated details of a NIC, many-to-many PCIe switch, and portions of system memory for NUMA nodes A and B in connection with performing a PCIe TPL memory write transaction, according to one embodiment;

DETAILED DESCRIPTION

Embodiments of methods, apparatus, and computer platforms and architectures employing many-to-many and many-to-one peripheral switches are described herein. In the following description, numerous specific details are set forth (such as embodiments employing PCIe-related components and operations) to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 2:
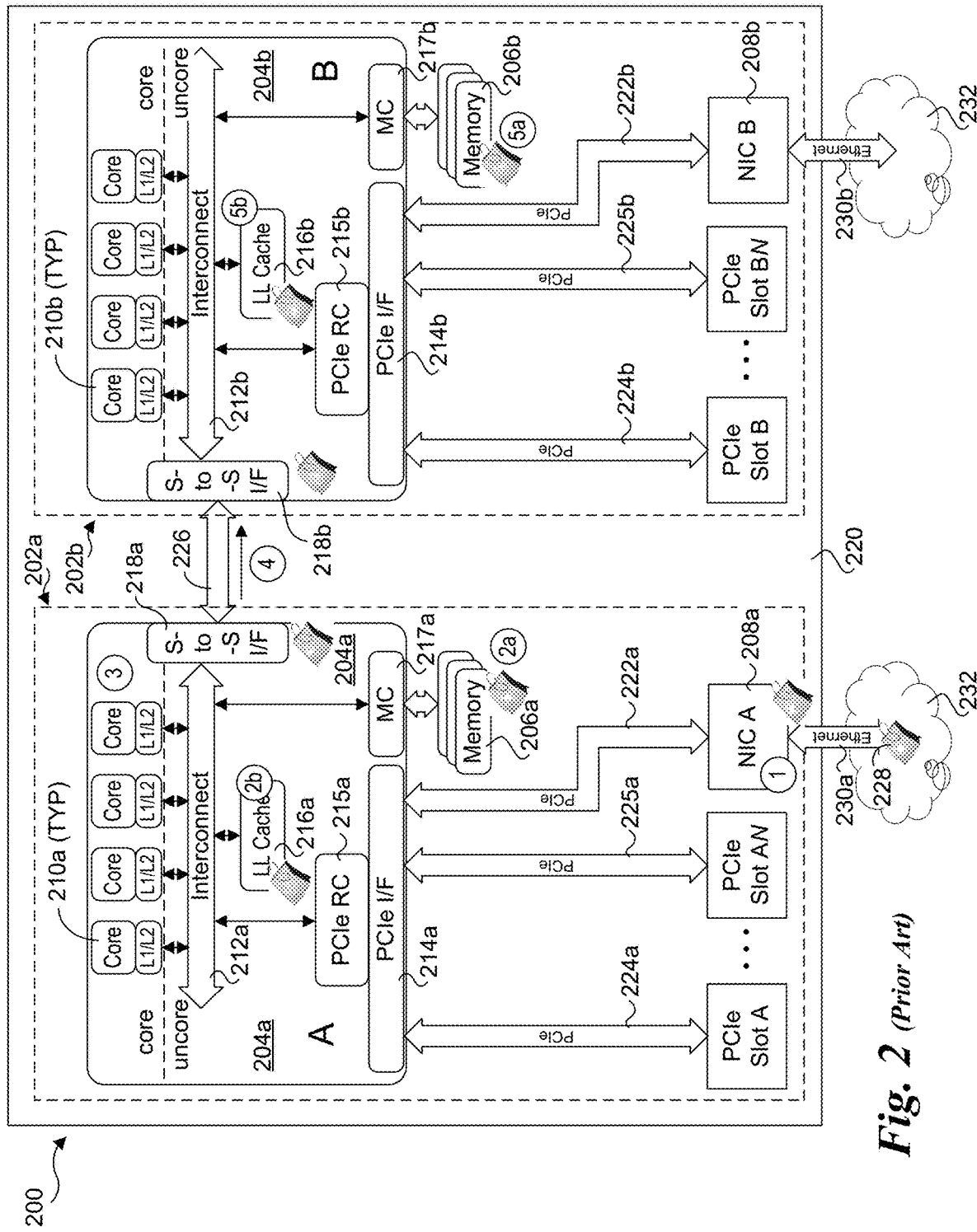
FIG. 2 is a schematic diagram of a NUMA platform architecture, further depicting processing of a packet under a conventional approach.

FIG. 2 illustrates a Non-Uniform Memory Access (NUMA) multi-processor platform architecture 200 employing two NUMA nodes 202a and 202b, also labeled 'A' and 'B'. For simplicity and convenience, reference to nodes herein may be to their letter label rather than their reference number. In addition, reference to a component that is common across nodes will be made to the base reference number, while a letter 'a', 'b', will be added to the reference number in the drawing Figures to identify that component on a particular node. For example, each of nodes A and B include a processor 204, which is labeled 204a for the processor for node A and 204b for the processor for node B.

In addition to a processor 204, each node includes system memory 206, a NIC 208, and a plurality of PCIe slots 1-N in which respective PCIe cards (not shown) may be installed. Each processor 204 includes a core portion including a plurality of processor cores 210, each including a local level 1 (L1) and level 2 (L2) cache. The remaining portion of the processor is referred to as the uncore, and includes various interconnect circuitry and interfaces for connecting various functional blocks on the processor in communication. For simplicity this interconnect circuitry is depicted as an interconnect 212; however, it will be understood that interconnect 212 may be representative of one or more interconnect structures, such as buses and single or multi-lane serial point-to-point or mesh interconnect structures.

Figure 1:
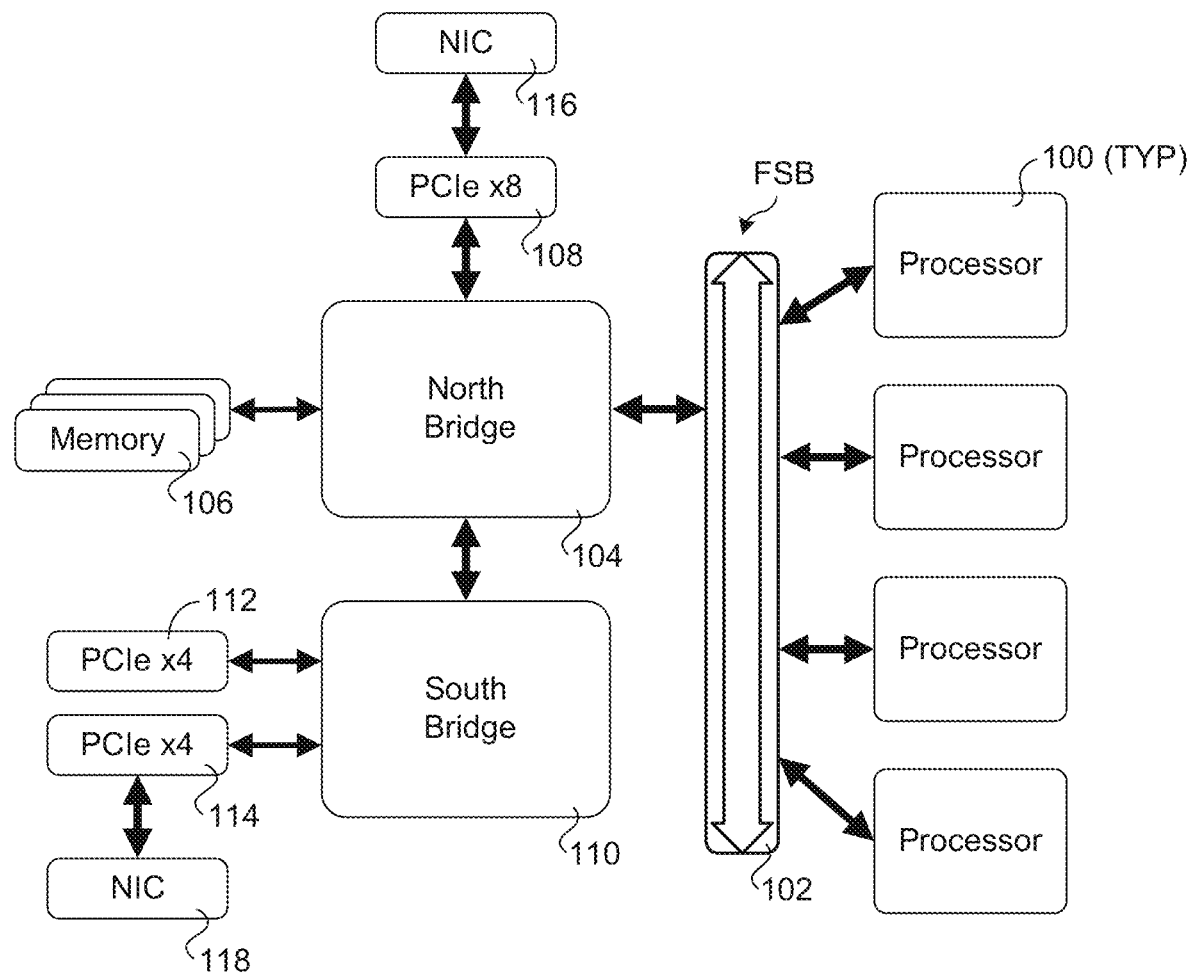
FIG. 1 is a schematic diagram of a conventional symmetric multi-processor platform architecture.

A portion of the uncore circuitry is configured to handle many of the North-bridge functions under the legacy architecture of FIG. 1, including memory control and PCIe interfaces for devices such as NICs. Corresponding exemplary functional blocks depicted in the processor uncores in FIG. 2 include a PCIe interface (I/F) 214, a PCIe Root Complex (RC) 215, a last level cache (LL Cache) 216, a memory controller (MC) 217, and a socket-to-socket link interface (S-to-S I/F) 218. In addition to these illustrated blocks, each processor 204 would include many other functional blocks that are not shown for clarity.

Each of processors 204 is operatively coupled to a printed circuit board called main board 220 via a socket, or otherwise coupled to the main board via a direct coupling technique, such as flip-chip bonding. In either case, it is common practice to refer to the processors themselves as sockets, and thus the usage of the terminology socket-to-socket links and interfaces for coupling processor nodes in communication. Main board 220 includes electrical wiring (e.g., traces and vias) to facilitate electrical connections corresponding to the physical structure of various interconnects depicted in FIG. 2. These interconnects include PCIe interconnects 222 between PCIe interfaces 214 and NICs 208, interconnects 224 and 225 between PCIe interfaces 214 and PCI slots 1-N, and a socket-to-socket link 226 coupled between socket-to-socket interfaces 218a and 218b. In one embodiment, socket-to-socket interfaces 218a and 218b employ the Intel Quickpath Interconnect (QPI)® protocol and wiring structure.

Under a NUMA architecture, processors (and processor cores) are enabled to access different memory resources distributed across the platform. The memory resources may be considered local memory resources (e.g., memory resources on the same node as a processor or core) or non-local memory resources (e.g., memory resources on other nodes). For example, under the viewpoint of node 202a, system memory 206a comprises a local memory resource, while system memory 206b comprises a non-local memory resource. Under another type of NUMA architecture (not depicted herein), non-local memory resources may also be shared between processors while not being associated with a particular processor or node. Since, for a given node, local memory resources are operatively coupled to a processor, while non-local memory resources are not, the access to the local memory resources relative to the non-local memory resources is not the same (e.g., the access is non-uniform). Moreover, it is preferable to employ local memory resources when available.

Under platform architecture 200, software running on a processor core in one node may be allocated a memory address space in system memory nominally associated with another node. Accordingly, under some embodiments the address space for a portion of the memory resources for a platform may be managed as a single global pool, with unique addresses for each memory address location within the pool. Additionally, a portion of the address space may be considered local address space that employs local addressing (e.g., address space allocated to an operating system), while another portion may be addressed using global addressing.

In accordance with another aspect of NUMA architectures, network ports (and thus associated NICs) may be assigned to software application that are running on processors (or processor cores) that are on nodes that are different than the node associated with the assigned port. When the memory allocated to the software application is on the same node as the processor, the NIC receiving the packets and the destined memory resource in which the packet data is to be written are on separate nodes.

As is well-known, NICs are configured to provide an interface with a computer network using a corresponding network protocol, such as the Ethernet protocol depicted in FIG. 2. Under a typical implementation, each NIC is associated with an operating system (OS) NIC (device) driver that is logically located in an OS kernel. The NIC driver is used as an abstracted interface between the operating system software and the NIC, which is a hardware device. For example, a NIC driver may provide access to registers on a NIC, provide a program interface to the NIC, etc. The NIC driver also facilitates handling and forwarding of data received via packets from the network to consumers of that data, such as a software application. For instance, under conventional usage packets are received at a NIC input port and buffered in an input buffer and then copied to a memory buffer in system memory that is allocated to the NIC driver by the operating system. Additionally processing of the packet data may also be performed by the NIC driver.

Under NUMA architectures, there may be instances where packets received via a computer network at a NIC on a first node need to be written to system memory or a memory cache associated with another node, as discussed above. Such a situation is illustrated in FIG. 2, which further shows how data corresponding to a packet 228 that is received by a NIC at a first node but contains data that is to be written to system memory or cache on a second node is handled under a conventional approach. In the example illustrated in FIG. 2, each of NICs A and B are connected via respective Ethernet links 230 to a network 232. For convenience, network 232 is shown as two separate clouds; however, it will be understood that these represent connections to the same network. Optionally, the depiction of separate clouds in the Figures herein may be interpreted as identifying connections to separate networks, regardless to whether they are depicted using the same reference number.

The handling of packet 228 proceeds as follows, with corresponding operations depicted by encircled numbers in FIG. 2. First, the packet is received from network 232 via Ethernet link 230a at an input port of NIC 208a, is buffered (e.g., temporarily stored) in an input buffer, and classified and/or otherwise a memory address to which the packet data is to be written is determined. During a second operation, a packet data of packet 228 is then copied from the input buffer and written to system memory 206a using a DMA (Direct Memory Access) write operation. This involves forwarding packet data corresponding to the packet from NIC 208a via PCIe link 222a and PCIe interface 214a to memory controller 216a via interconnect 212a using a PCIe memory write transaction. Memory controller 216a then writes the packet data to system memory 206a, as depicted at an operation 2a. Optionally, the packet data is written to LL Cache 214a, as depicted by an operation 2b. The use of a DMA write operation enables the memory write to be performed independent of an operating system.

As will be understood by one skilled in the networking arts, forwarding packet data from one storage location to another is commonly termed forwarding the packet, regardless of the number of copies of the packet data that are employed. Accordingly, forwarding a packet or forwarding packet data in the detailed description and the claims includes implied data copy operations, as applicable. In addition, forwarding a packet or forwarding packet data may include transferring a portion or portions of the data in the packet, the complete packet, and/or meta-data associated with the packet such as classification results, hash values, etc.

Depending on the implementation, during a third operation a software entity running on one of cores 210a (e.g., a NIC driver) will either detect or be apprised of the arrival of packet 228 in system memory 206a or LL Cache 216a and determine that the packet data is actually associated with (e.g., the consumer of the packet is) a consumer software application having a memory allocation including a portion of the memory address space of system memory 206b on node B. Or more simply, a determination will be made that the packet data is to be written to an address within an address range associated with system memory 206b. Accordingly, during a forth operation the data for packet 228 is copied from system memory 206a or LL Cache 216a to a first buffer on socket-to-socket interface 218a on node A and sent to socket-to-socket interface 218b on node B over interconnect link 226, where it is received in a second buffer. Depending on the implementation, the buffered copy of packet 228 is either then written to system memory 206b or LL Cache 216b during a fifth operation, as depicted by operations 5a and 5b. At this stage, the packet data may be accessed by the software application that is a consumer of the packet via its location in either system memory 214b or LL Cache 216b.

The foregoing conventional approach requires the involvement of several hardware components and software entities, increasing processor overhead and interconnect traffic, resulting in additional packet transfer latency and cache pollution. These problems are addressed by embodiments of the present invention, as now discussed. Under the embodiments disclosed herein, packets received at a NIC for a first node that are destined to be written to system memory or cache corresponding to a second node are forwarded to an applicable PCIe root complex on the second node via a many-to-many PCIe switch. Once the packet is received at the PCIe root complex, it is handled as if the packet was received from the network via the second NIC to begin with. Thus, this process is transparent to other components and software entities running on both the first and second nodes.

Figure 3:
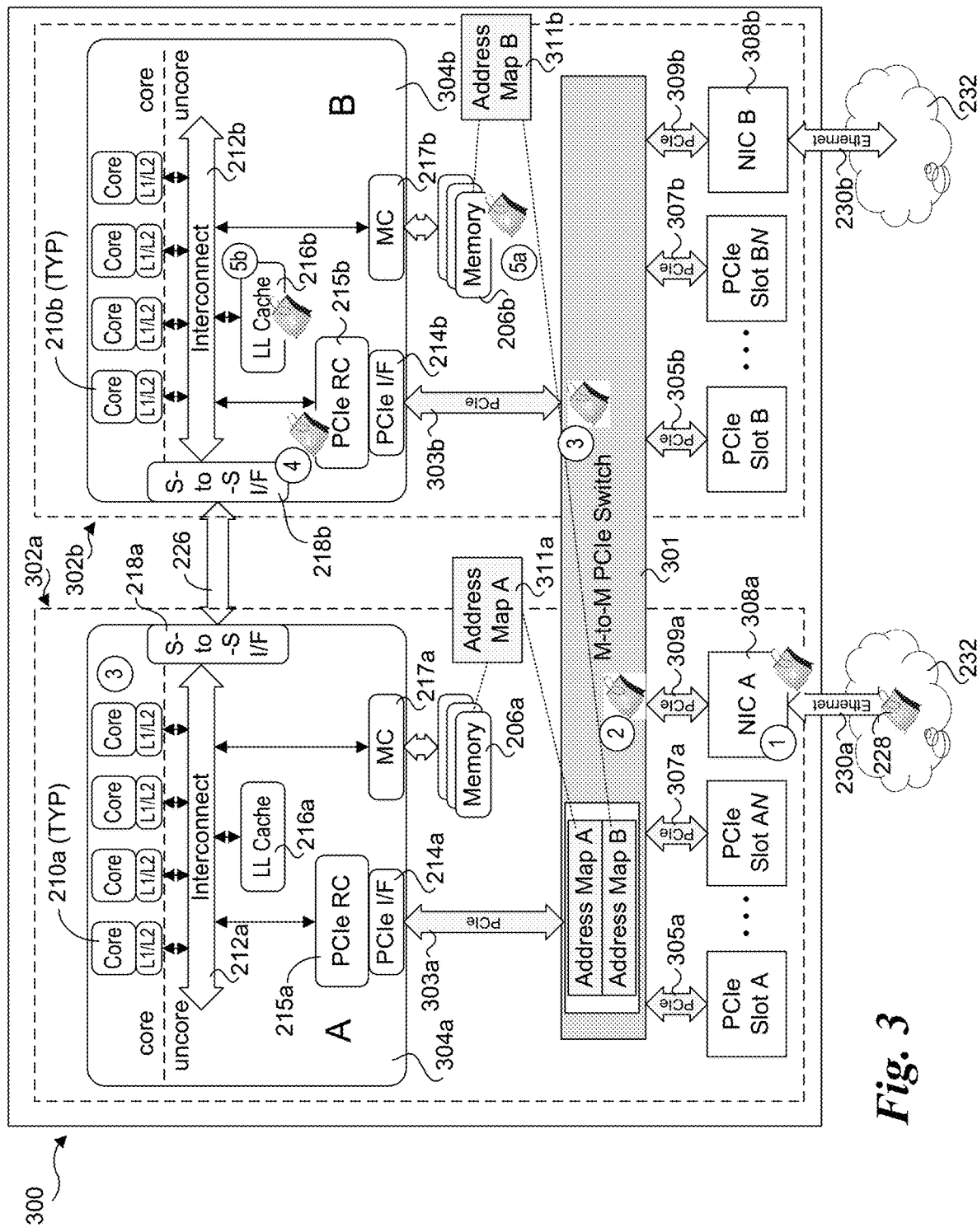
FIG. 3 is a schematic diagram of a NUMA platform architecture employing a many-to-many PCIe switch, according to one embodiment.

FIG. 3 shows a NUMA multi-processor platform architecture 300 including NUMA nodes 302a and 302b that is configured to implement the foregoing approach, according to one embodiment. Aspects of platform architecture 300 are similar to platform architecture 200, where like-numbered components perform similar operations, while augmented and new components are shown in light gray. This includes a many-to-many (M-to-M) PCIe switch 301, PCIe interconnects 303a, 303b, 305a, 305b, 307a, 307b, 309a and 309b, and address maps 311a and 311b, which facilitate communication between NICs 308a and 308b (NIC A and NIC B) and processors 304a and 304b at respective PCIe interfaces 214a and 214b. FIG. 3 further shows how data corresponding to a packet 228 that is received by a NIC at a first node (A) but contains data that is to be written to a memory resource on a second node (B) is handled under NUMA platform architecture 300.

Under the FIG. 3 embodiment, handling of packet 228 proceeds as follows. As before, the packet is received at NIC 308a from network 232 via Ethernet link 230a and is buffered in an input buffer on the NIC during a first operation. During a second operation corresponding to an initial packet processing operation performed by NIC 308a, the packet header and/or packet payload for packet 228 is inspected, and applicable filter match input data is generated based on packet header field data and/or packet payload data, which is then employed by packet processing logic on NIC 308a as an input lookup against filters and/or rules defined in an address table. As detailed below, the filters and/or rules in the address table identifies the system memory address to which applicable packet data is to be written.

In one embodiment, the operation of NICs 308a and 308b is similar to the operation of NICs 208a and 208b in the conventional scheme of FIG. 2. That is, in connection with buffering packet data and performing some initial packet processing, the packet data is copied to system memory via a DMA write operation. Under a NUMA architecture, portions of the system's memory is accessed via different NUMA nodes, as described above. At the same time, the address space for the system is a global address space, such that there is only a single location in system memory for a given address. Moreover, from the perspective of peripheral devices and the like, such as NICs 308a and 308b, this global address space appears to be a physical address space, although it may actually be implemented by an operating system as a virtual address space. Additionally, another layer of address virtualization may be implemented by virtual machines running on the host platform operating system.

Under the embodiment illustrated in FIG. 3, the system memory DMA write operation is implemented via a PCIe Transaction Layer Packet (TLP) memory write transaction. (For simplicity, such PCIe TPL memory write transactions may be referred to as a PCIe memory write transaction.) Under the illustrated architecture, a NIC initiating a PCIe memory write transaction is agnostic to where the physical location of the memory cache line(s) that is/are to be written to. Accordingly, the NIC (in this example NIC 308a) simply generates a PCIe memory write transaction with a destination address corresponding to the memory address at which the write transaction payload data is to be written. The PCIe memory write transaction is then sent as one or more PCIe packets from NIC 308a via PCIe interconnect 309a, where it is received at an input port of many-to-many PCIe switch 301. Upon being received, each packet is routed internally within many-to-many PCIe switch 301 from an ingress buffer at the input (PCIe downstream) port to an output buffer at an output (PCIe upstream) port connected to PCIe interconnect 303b. This routing is facilitated via address maps 311a and 311b, which contain mappings between memory addresses and corresponding output ports on many-to-many PCIe switch 30 via which the PCIe memory write transactions are to be forwarded so they can reach an appropriate PCIe root complex and (eventually) the applicable memory controller and/or caching agent for completing the memory write transaction. The routing of PCIe memory write transaction packets is configured such that packets are forwarded to the NUMA node via which the portion of system memory address space corresponding to the transaction's destination address can be accessed, regardless of whether the initiating device (or the transaction) is logically associated with that NUMA node or another NUMA node. As explained in further detail below, from the perspective of NICs 308a and 308b, they are each connected to PCIe RC's 215a and 215b via separate logical PCIe switches.

As shown by operations 2 and 3 in FIG. 3, the packet is internally routed within many-to-many PCIe switch 301 from the input port coupled to PCIe interconnect 209a to the output port coupled to PCIe interconnect 303b. The packet is then forwarded from this output port via PCIe interconnect 303b, where it is received at PCIe interface 214 of PCIe root complex 215b, as depicted by operation 4. From the PCIe root complex, the PCIe memory write transaction is forwarded to memory controller 216a or an applicable caching agent (not shown), resulting in the transaction payload data being written to system memory 206b or LL Cache 217b, as respectively depicted by operations 5a and 5b.

Figure 3A:
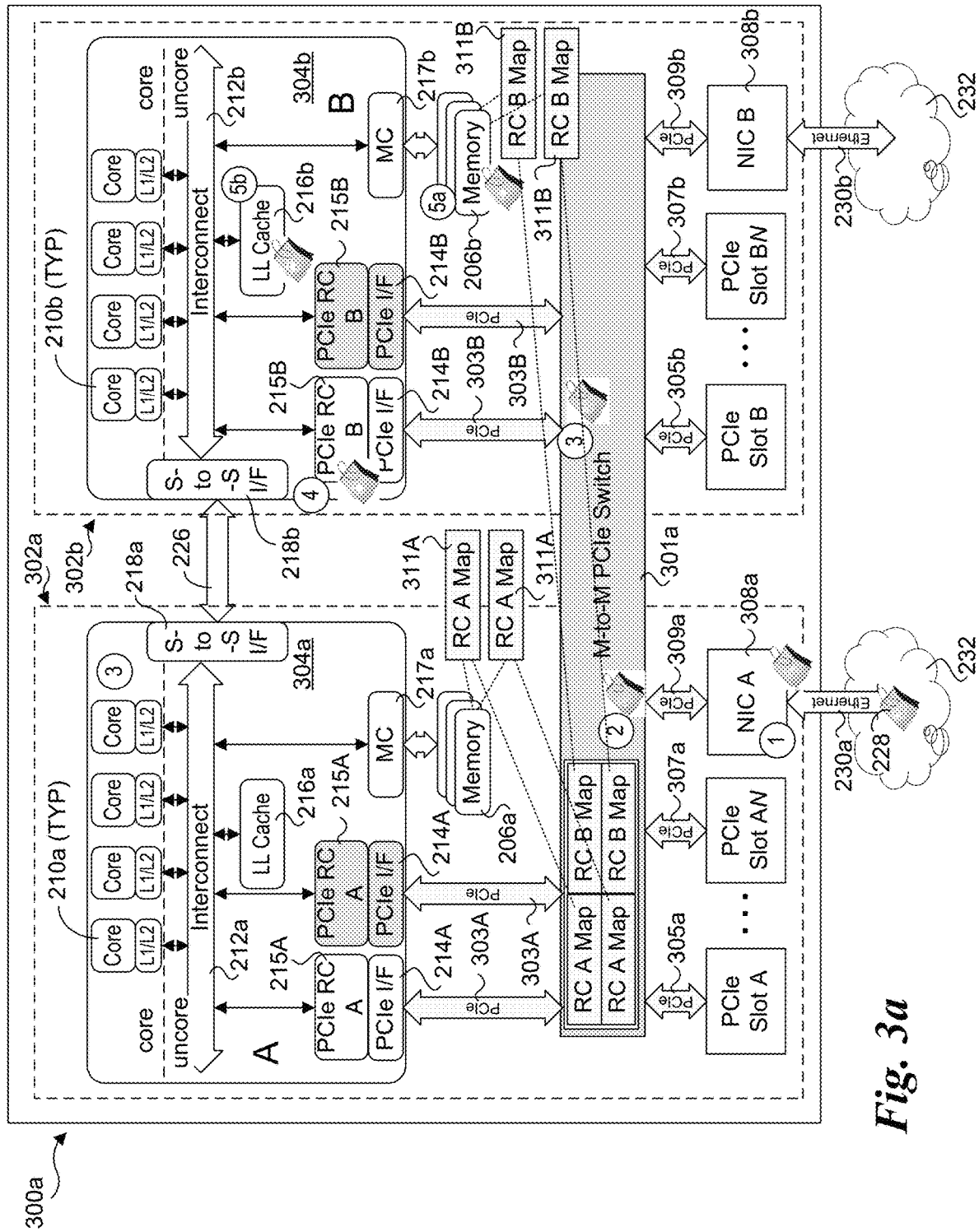
FIG. 3a is a schematic diagram of a NUMA platform architecture employing a many-to-many PCIe switch and including two uplinks for each NUMA node, according to one embodiment.

FIG. 3a shows a NUMA multi-processor platform architecture 300a including two PCIe root complexes for each of NUMA nodes 304a and 304b, labeled PCIe RC's 215a1, 215a2, 215b1, and 215b2. As before, aspects of platform architecture 300a are similar to platform architectures 200 and 300, where like-numbered components perform similar operations, while augmented and new components are shown in light gray. In addition to the PCIe root complexes, architecture 300a includes PCIe interconnects 303a1, 303a2, 303b1, and 303b2, which are coupled to a many-to-many PCIe switch 301a. To help facilitate packet routing within the switch, many-to-many PCIe switch 301a includes address maps 311a1, 311a2, 311b1, and 311b2, as illustrated.

FIG. 3a further depicts receiving a packet 228 from network 232 at NIC 308a, and the forwarding of the packet data via a corresponding PCIe memory write transaction. The operations for implementing the PCIe memory write transaction are similar to those shown in FIG. 3 and discussed above, except that the applicable PCIe root complex is PCIe root complex 215b1 rather than PCIe root complex 215b.

Figure 3B:
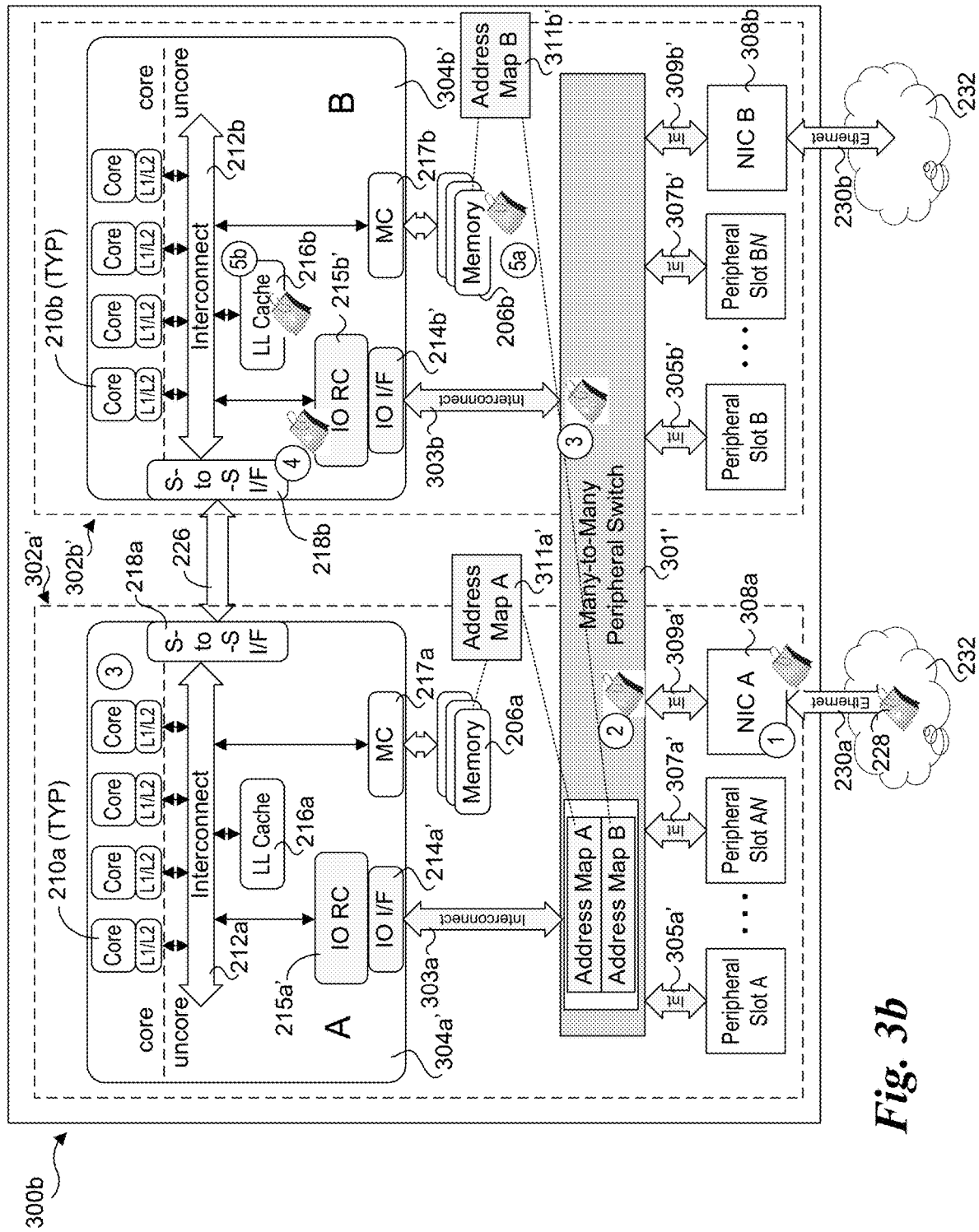
FIG. 3b is a schematic diagram of a NUMA platform architecture employing a many-to-many peripheral switch, according to one embodiment.

The PCIe many-to-many switches disclosed herein are specific examples of more general many-to-many peripheral switches that may be implemented using the techniques provided herein. An example of a NUMA architecture 300b employing a many-to-many peripheral switch 301' is shown in FIG. 3b, wherein components with similar functions to those shown in FIGS. 2, 3a, and 3b share the same reference numbers. In addition, a prime (') has been added to some of the reference numbers in FIG. 3b to indicate similar components that have been augmented.

In further detail, many-to-many peripheral switch 301' is connected to 10 root complexes 215a' and 215b' as IO interfaces 214a' and 214b' via respective interconnects 303a' and 303b'. Many-to-many peripheral switch 301' is also connected to peripheral slots A1 . . . AN, NIC 308a, peripheral slots B1 . . . BN, and NIC 308b via respective interconnects, as depicted by interconnects 305a', 307a', 309a', 305b', 307b', and 309b'. Generally, IO root complexes 215a' and 215b' represent a top level or root entity in an existing or future IO interconnect hierarchy, including interconnect hierarchies that may employ multiple protocols (e.g., through the use of interconnect-to-interconnect bridges or the like). For example, it is anticipated that future augmentations may be made to existing PCIe specifications, including new specifications defining an interconnect structure and protocol with a different name than PCIe. Accordingly, many-to-many peripheral switch is intended to illustrate implementations with these interconnect structures and protocols. Many-to-many peripheral switch is also illustrative of implementations with non-PCIe interconnects, such as but not limited to Open Core Protocol (OCP) interconnects.

Figure 3C:
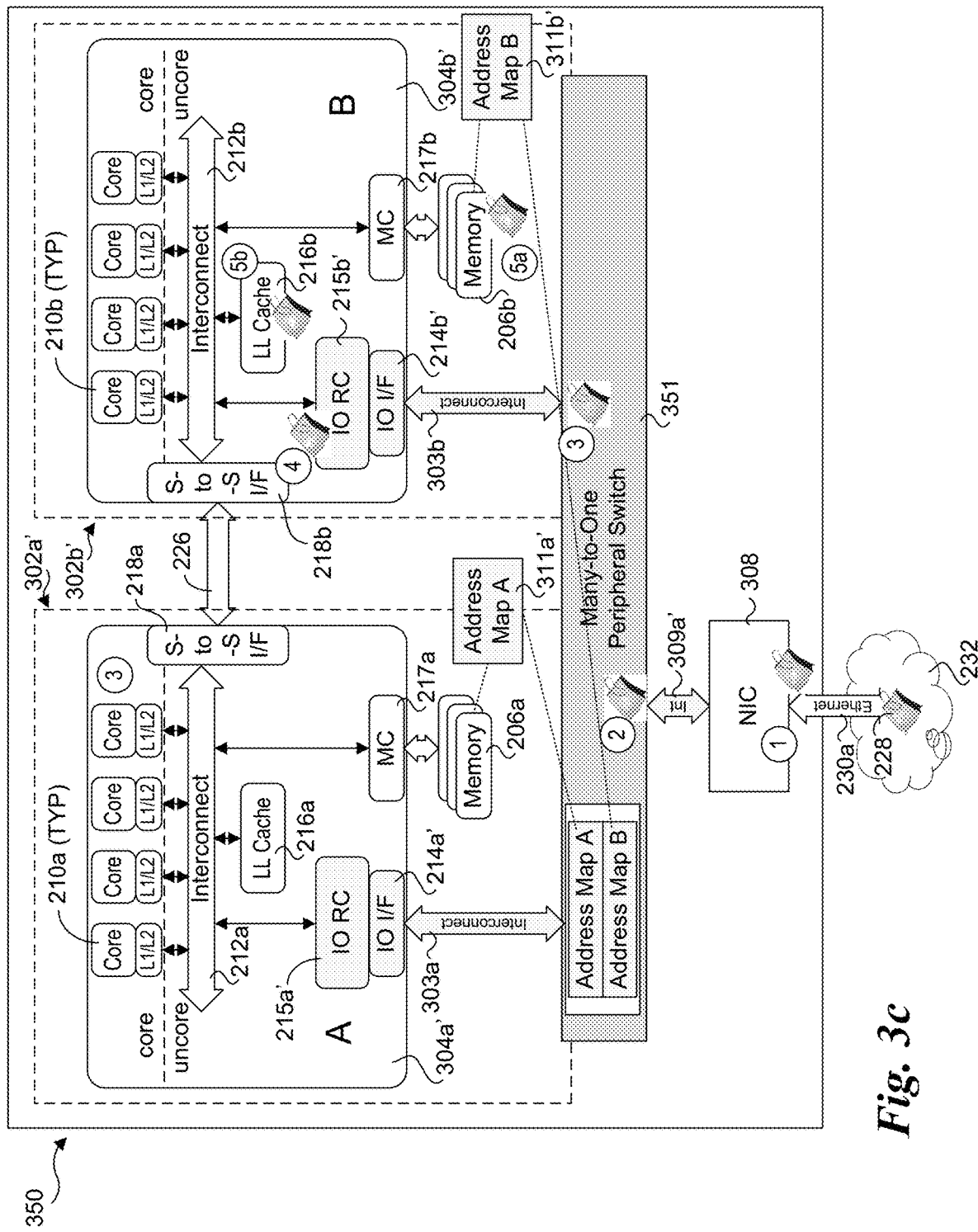
FIG. 3c is a schematic diagram of a NUMA platform architecture employing a many-to-one peripheral switch, according to one embodiment.

In addition to many-to-many peripheral switches, many-to-one peripheral switches may also be implemented in a similar manner. For example, under the configuration shown in platform architecture 350 of FIG. 3c, a many-to-one peripheral switch 351 is employed to facilitate sharing of network access provided via a single NIC 308 with NUMA nodes 304a' and 304b'. Although one two NUMA nodes are illustrated in FIG. 3c, the many-to-one peripheral switch architecture may be configured to support an N-to-one peripheral switch, where N is an integer ≥2. In addition to access to a NIC, under some embodiments a many-to-one peripheral switch may be configured to interface with a MAC layer of a NIC, including both single-port and multiport NICs.

Figure 4:
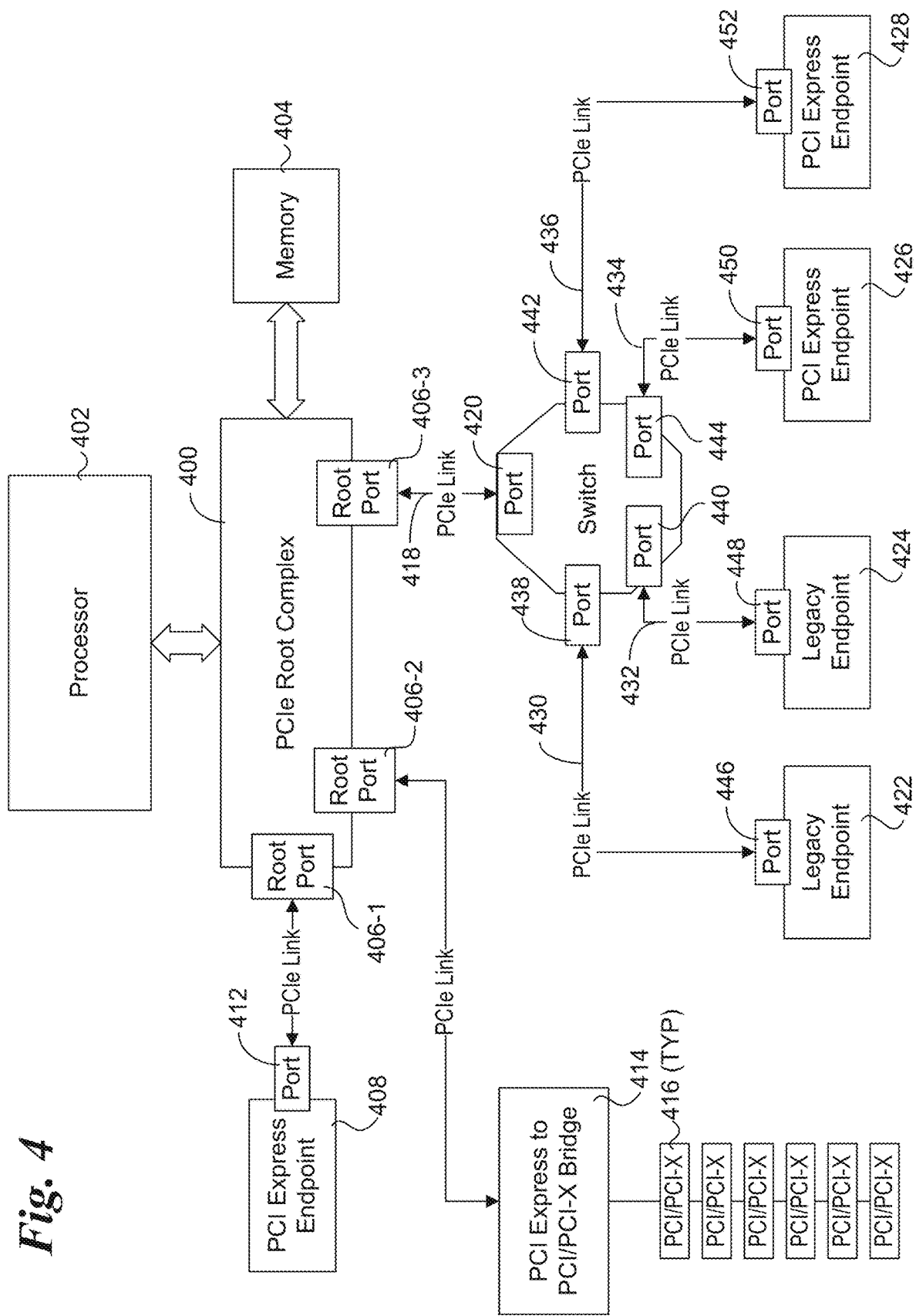
FIG. 4 is a diagram of a generic PCIe architecture.

As discussed herein, embodiments of many-to-many PCIe switches and many-to-one PCIe switches are employed for forwarding PCIe transaction packets between transaction source and destination endpoints. Accordingly, to better understand aspects of the embodiments, the following brief discussion of a generic PCIe architecture illustrated in FIG. 4 is provided.

The PCIe architecture includes in a PCIe Root Complex (RC) 400 coupled to a processor 402 and memory 404. The PCIe RC 400 is depicted as including three Root Ports 406-1, 406-2, and 406-3. Root Port 406-1 is connected to a PCI Express endpoint 408 via a PCIe link 410 and a PCIe port 412. Root Port 406-2 is connected to a PCI Express to PCI/PCI-X bridge 414, which is used as an interface between PCIe and a plurality of PCI/PCI-X devices 416. Root Port 406-3 is connected to a switch 416 via a PCIe link 418 and a PCIe port 420. Switch 416 is depicted as connected to a pair of legacy endpoints 422 and 424, and a pair of PCI Express endpoints 426 and 428. These connections are facilitated by PCIe links 430, 432, 434 and 436, and ports 438, 440, 442, 444, 446, 448, 450, and 452.

A Root Complex denotes the root of an IO (Input/Output) hierarchy that connects the CPU/memory subsystem to the IO. As illustrated in FIG. 4, a Root Complex may support one or more PCI Express Ports. Each interface defines a separate hierarchy domain. Each hierarchy domain may be composed of a single Endpoint or a sub-hierarchy containing one or more Switch components and Endpoints. A Root Complex may optionally support routing of peer-to-peer transactions between hierarchy domains.

Endpoint refers to a type of Function that can be the Requester or Completer of a PCI Express transaction either on its own behalf or on behalf of a distinct non-PCI Express device (other than a PCI device or Host CPU), e.g., a PCI Express attached graphics controller or a PCI Express-USB host controller. Endpoints are classified as either legacy, PCI Express, or Root Complex Integrated Endpoints.

PCIe supports a point-to-point interconnect using serial links made up of one or more lanes for each of transmission and receiving data. A PCIe link has at least one lane—each lane represents a set of differential signal pairs (one pair for transmission, one pair for reception). To scale bandwidth, a link may aggregate multiple lanes denoted by xN where N may be any of the supported link widths. For example, as of the PCIe 3.0 specification, PCIe links include operations for x1, x2, x4, x8, x12, x16, and x32 lane widths. (As used herein, PCIe specification shall refer to the PCIe 3.0 and later specifications, as applicable.) During hardware initialization, each PCI Express link is set up following a negotiation of lane widths and frequency of operation by the two agents at each end of the link.

Figure 5:
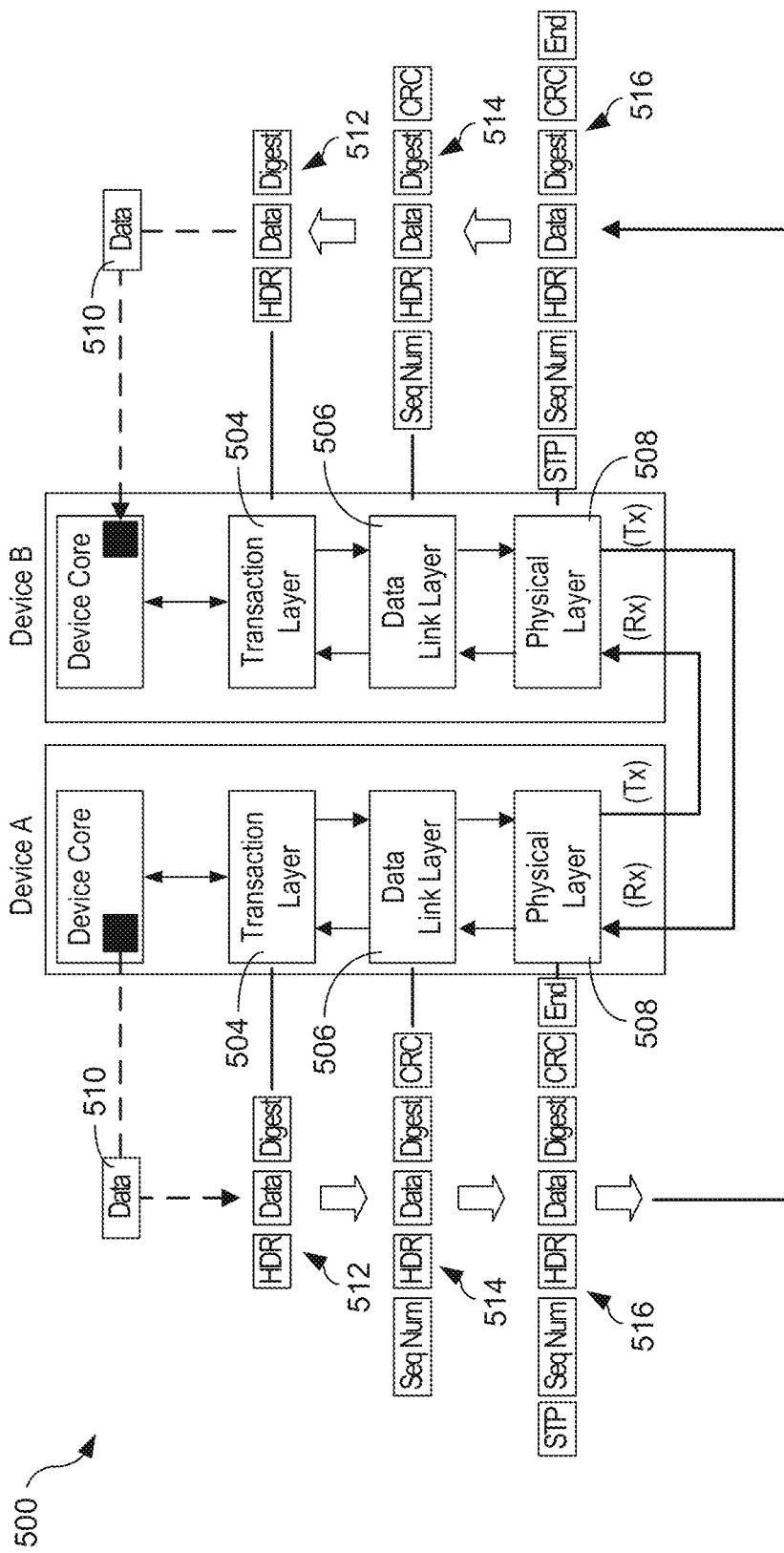
FIG. 5 is a diagram illustrating the layers of a PCIe stack and details of packet assembly/disassembly at each layer.

Diagram 500 of FIG. 5 shows details of the PCI Express layered protocol and TLP (Transaction Layer Packet) Assembly/Disassembly. Under PCIe, data is transferred in a packetized form between two PCIe endpoints or ports, as depicted by a Device A, and a Device B. As discussed above, PCIe links comprise single or multi-lane point-to-point interconnects. Moreover, the point-to-point interconnects are configured in unidirectional point-to-point interconnect pairs in opposing directions such that each link pair supports bi-directional communication. Transfers originate from a sender or transmitter, and are received by a receiver. Data that is being sent is transmitted over a transmit (Tx) path and corresponding data is received over a receive (Rx) path. The two major classes of packets exchanged between PCIe devices are high level Transaction Layer Packets (TLPs), and low-level link maintenance packets called Data Link Layer Packets (DLLPs). Collectively, the various TLPs and DLLPs enable two PCIe devices to perform memory, TO, and configuration space transactions reliably and use messages to initiate power management events, generate interrupts, report errors, etc.

The three lower layers of the PCIe standard include a Transaction Layer, a Data Link Layer, and a Physical (PHY) layer. Accordingly, each of Devices A and B are depicted as including a transaction layer (block) 504, a data link layer (block) 506, and a physical layer (block) 508. An initiator device (e.g., Device A in this example), generates data 510 to be sent to a recipient device (e.g., Device B), which is then packetized by the PCIe layers and transmitted over the link. In the context of a PCIe transaction, the initiator is called the Requester, and the recipient is called the Completer.

At the Transaction Layer, the data is packetized into one or more packets having a packet format 512 including a Header (HDR), the packet payload data (Data), and a Digest. At the Data Link Layer a Sequence Number (SeqNum) is added to the beginning of the packet, along with a CRC appended to the end to form a packet format 514. The packet format is further augmented at the Physical Layer by adding STP and End control (K) characters to form a packet format 516. The packet is then sent over the link to be processed by the receiver (Device B) using the reverse sequence, eventually yielding the original data 510.

As discussed above, the PCIe specification requires a hierarchical domain structure. This means any given endpoint must be associated with a single port on a specific root complex. In order to comply with the PCIe specification, this requirement must be adhered to. Embodiments of the many-to-many PCIe switches disclosed herein support switching between PCI ports in a many-to-many manner while conforming to the PCIe specification hierarchical domain requirements. This is obtained, in part, as follows.

First, downstream links are logically associated to a specific upstream link. This defines their domain within the PCIe hierarchy and is used for PCIe enumeration. For this purpose, it appears (from the perspective of a root complex) that each root complex is connected via a single uplink connection to a separate one-to-many conventional PCIe switch that has multiple PCIe downlinks connected to a portion or all of the PCIe slots and/or NICs on the platform. As detailed below, these separate switches are implemented as logical switches employing logically separate domains, one for each PCIe root complex, as the specification requires. Second, strict routing of configuration packets is adhered to. Accordingly, configuration packets are not allowed to cross these logical domains.

Figure 6:
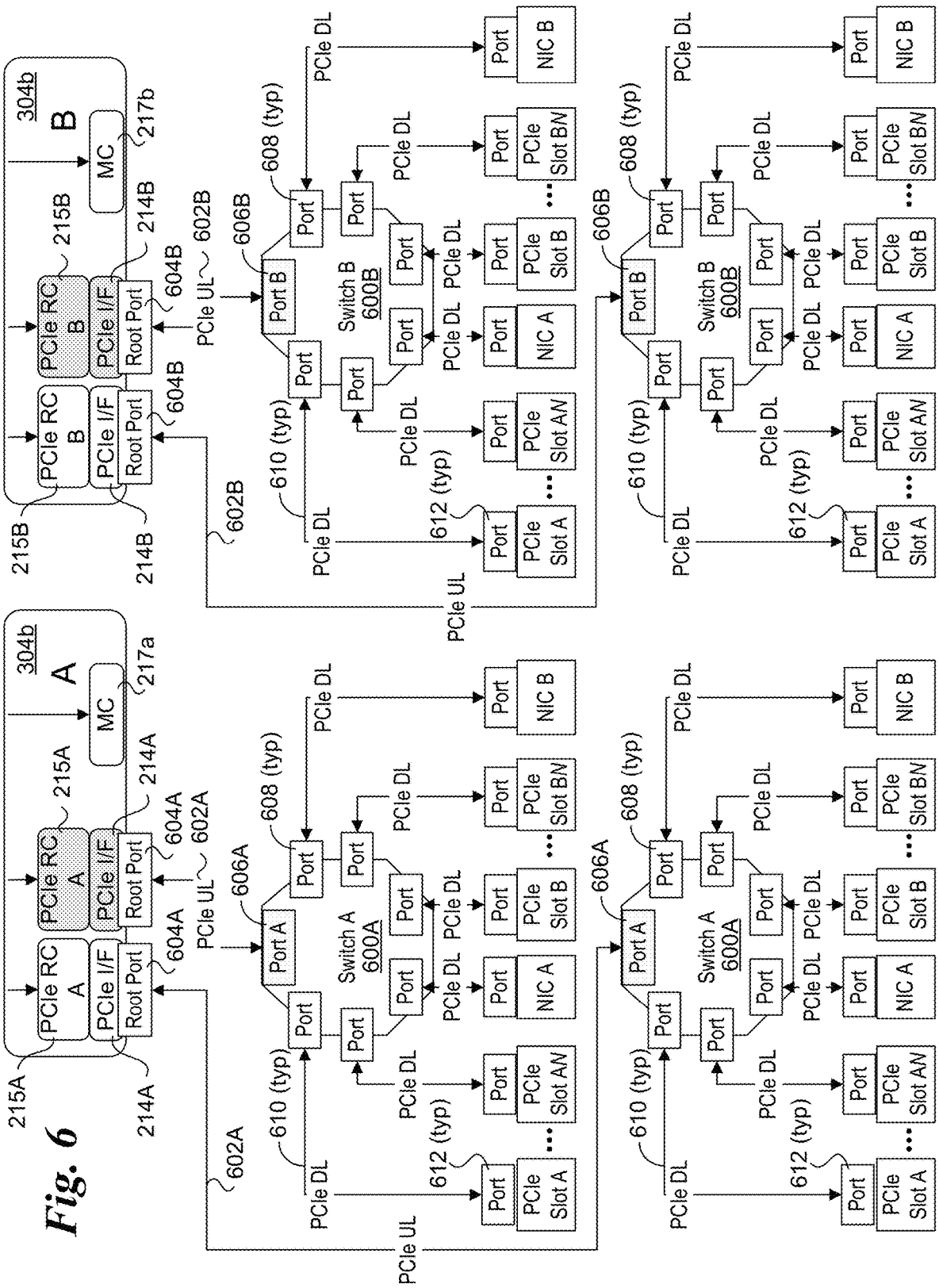
FIG. 6 is a schematic diagram illustrating logical switching aspects of a many-to-many PCIe switch, according to one embodiment.
Figure 7:
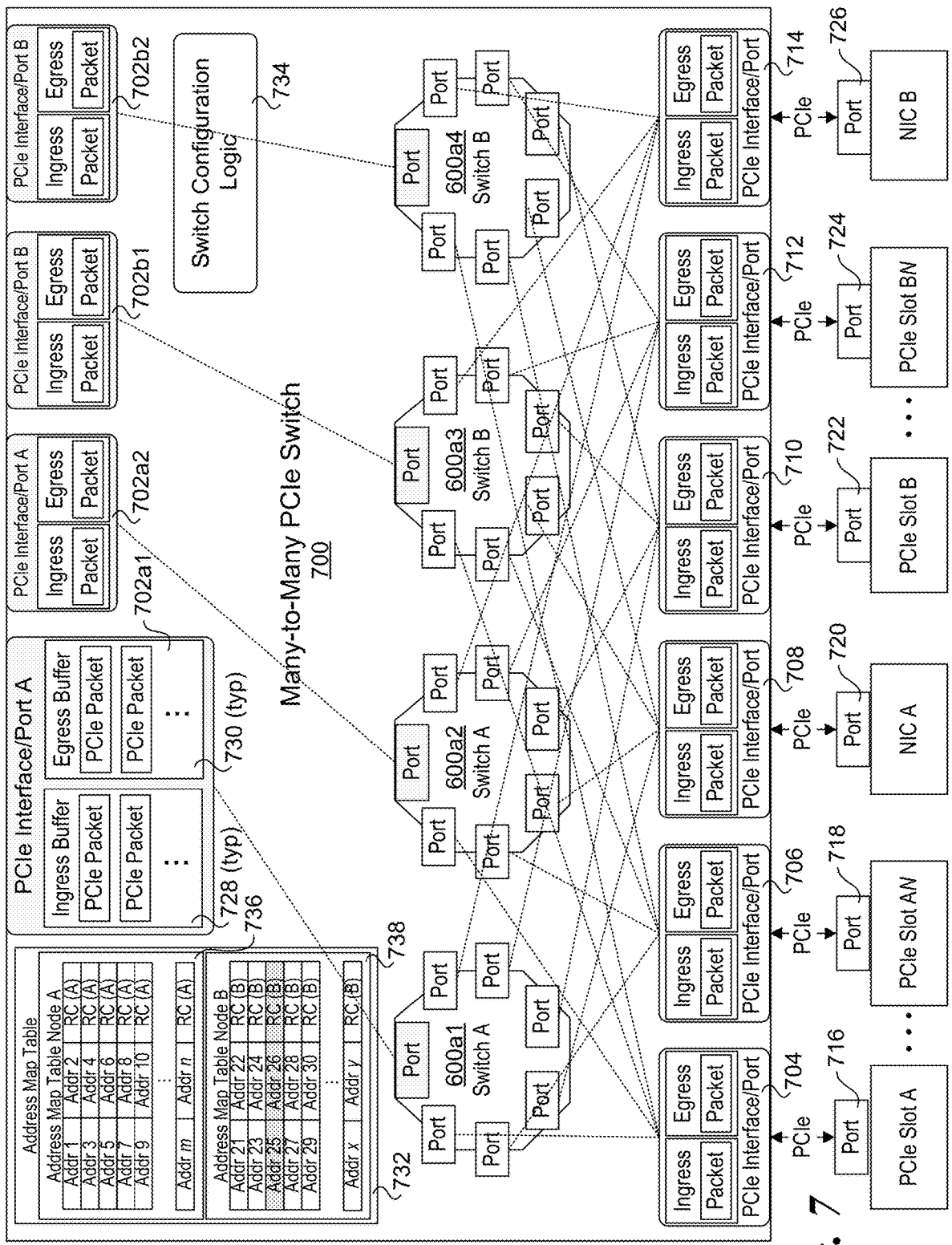
FIG. 7 is a schematic diagram illustrating internal structure and logic of a many-to-many PCIe switch, according to one embodiment.

The use of logical switches and logical PCIe domains is illustrated by way of example in FIGS. 6 and 7. As illustrated in FIG. 6, each PCIe root complex 215 is connected to a respective logical PCIe switch 600 via a PCIe uplink (UL) 602 coupled between a root port 604 and an upstream port 606. For example, PCIe root complex 215a2 is connected to a logical PCIe switch 600a2 via a PCIe uplink 602a2 coupled between a root port 604a2 and an upstream port 606a2. Each downstream port 608 on the logical PCIe switch is connected via a PCIe downlink (DL) 610 to a respective upstream port 612 of a PCIe interface for a corresponding PCIe slot or NIC. In the embodiment illustrated in FIG. 6, each of logical switches 600a1, 600a2, 600b1 and 600b2 is similarly configured and provides a downlink connection to PCIe endpoints comprising PCIe slots A1-AN, NIC A, PCIe slots B1-BN, and NIC B. (It is noted that there is only a single physical instance of each of PCIe slots A1-AN, NIC A, PCIe slots B1-BN, and NIC B; however, for illustrative purposes four separate instances of these PCIe endpoints are shown in FIG. 6.) The logical switch downlink to PCIe endpoint configuration of FIG. 6 is merely exemplary, as a given logical switch may be connected via PCIe downlinks to all or a portion of the PCIe slots and/or NICs. It is also noted that reference and depiction herein to a NIC being connected to a PCI downstream port is merely illustrative, as the NIC (or similar network interface circuitry and logic) may be implemented on a network adaptor card or the like that occupies one of the PCIe slots.

FIG. 7 illustrates further details of one embodiment of a many-to-many PCIe switch 700. Similar to that shown in FIG. 6, many-to-many PCIe switch 700 has four logical switches 600a1, 600a2, 600b1 and 600b2. Each logical switch includes a respective upstream port that is associated (only) to that switch, as depicted by upstream ports 702a1, 702a2, 702b1 and 702b2. Conversely, the downstream ports 704, 706, 708, 710, 712, and 714 of many-to-many PCIe switch 700 are shared across logical switches 600a1, 600a2, 600b1 and 600b2, such that each of the downstream ports can be accessed via each logical switch. Each downstream port is connected to a respective upstream port at the PCIe interface for each of PCIe slots A1-AN and B1-BN, and NICs A and B, as depicted by upstream ports 716, 718, 720, 722, 724, and 726.

Each of the upstream and downstream ports is associated with a PCIe interface that includes an ingress buffer 728 and an egress buffer 730, as shown for upstream port 702a1. In further detail, each ingress buffer 728 is associated with an ingress PCIe port, while each egress buffer is associated with an egress PCIe port; however, for simplicity it is common practice to show both the ingress and egress PCIe ports as a single port in PCIe hierarchy diagrams. In one embodiment, the ingress and egress buffers are implemented as FIFO (First-in, First-out) buffers. However, various other types of buffers and associated logic may be implemented in accordance with the PCIe specification. For example, PCIe switches may be configured to support different quality of service (QoS) classes under which packets of a given service class may have priority over packets of other classes. Accordingly, an ingress or egress port may employ multiple buffers and/or employ one or more sets of pointers that are used to handle multiple QoS classes of packets using PCIe Traffic Class labels.

Many-to-many PCI switch 700 further includes an address map table 732 and switch configuration logic 734. For illustrative purposes, address map table 732 is depicted as including separate address maps 736 and 738 for NUMA nodes A and B, respectively. In one embodiment, address map table 732 is configured to store address maps associated with each PCIe root complex (and accordingly, each logical switch), which are generated during system run-time operations as described below with reference to flowchart 1000 of FIG. 10. In practice, the address map table entries may be partitioned by NUMA node, by PCIe root complex, have no partition, or employ some other type of partitioning scheme. In addition, an address map table entry may reference an identifier for a PCIe upstream port via which a corresponding PCIe root complex is accessed, rather than or in addition to an identifier for the PCIe root complex. Accordingly, the PCIe upstream ports in FIG. 7 are also labeled PCIe Interface/Port A1, A2, B1, and B2, wherein the upstream port identifiers (IDs) are respectively A1, A2, B1, and B2 and address map table 732 would include these upstream port IDs.

Figure 7A:
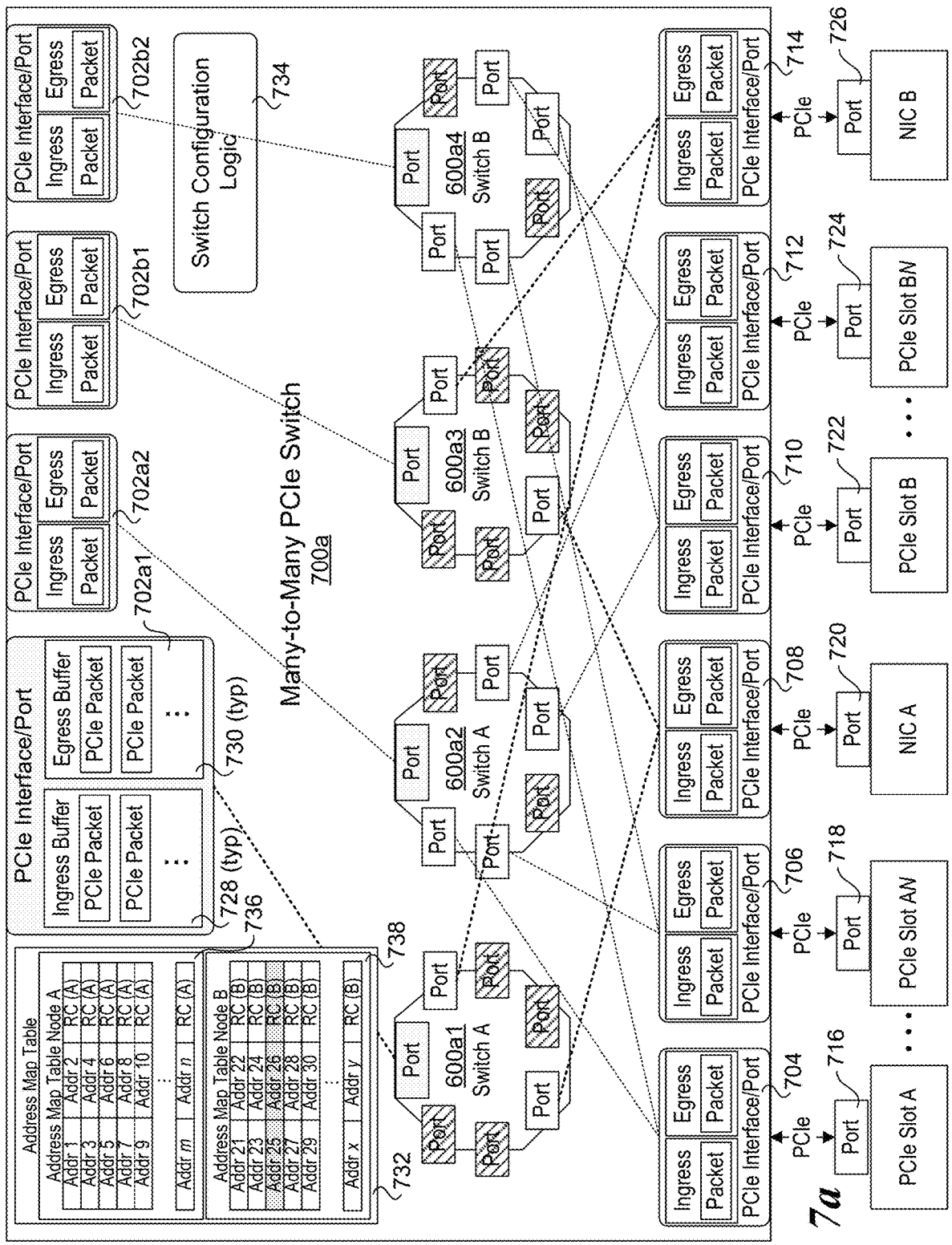
FIG. 7a is a schematic diagram illustrating an augmented version of the architecture of FIG. 7 using a pair of logical switches that are dedicated to network traffic, according to one embodiment.

Under many-to-many PCIe switch 700 of FIG. 7, each downstream port is logically connected (and physically connectable via switching logic) to each upstream port. Alternatively, one or more of the downstream ports may be associated with only a portion of the logical switches, as shown in many-to-many PCIe switch 700a of FIG. 7a. Since NIC traffic is typically greater than other types of I/O device traffic, under the illustrated embodiment a NIC may be accessed via a dedicated PCIe root complex on each NUMA node, with no other endpoints connected to the many-to-many PCIe switch accessing the dedicated PCIe root complexes; accordingly, there would be no need to provide internal routing between the downstream port the NIC is connected to and the upstream ports that are connected to other PCIe root complexes in the system. An example of this configuration is illustrated in FIG. 7a, wherein unused logical switch ports are shown in crosshatch. The circuitry for implementing the logical switch may be configured such that these unused ports do not exist to begin with.

Figure 7B:
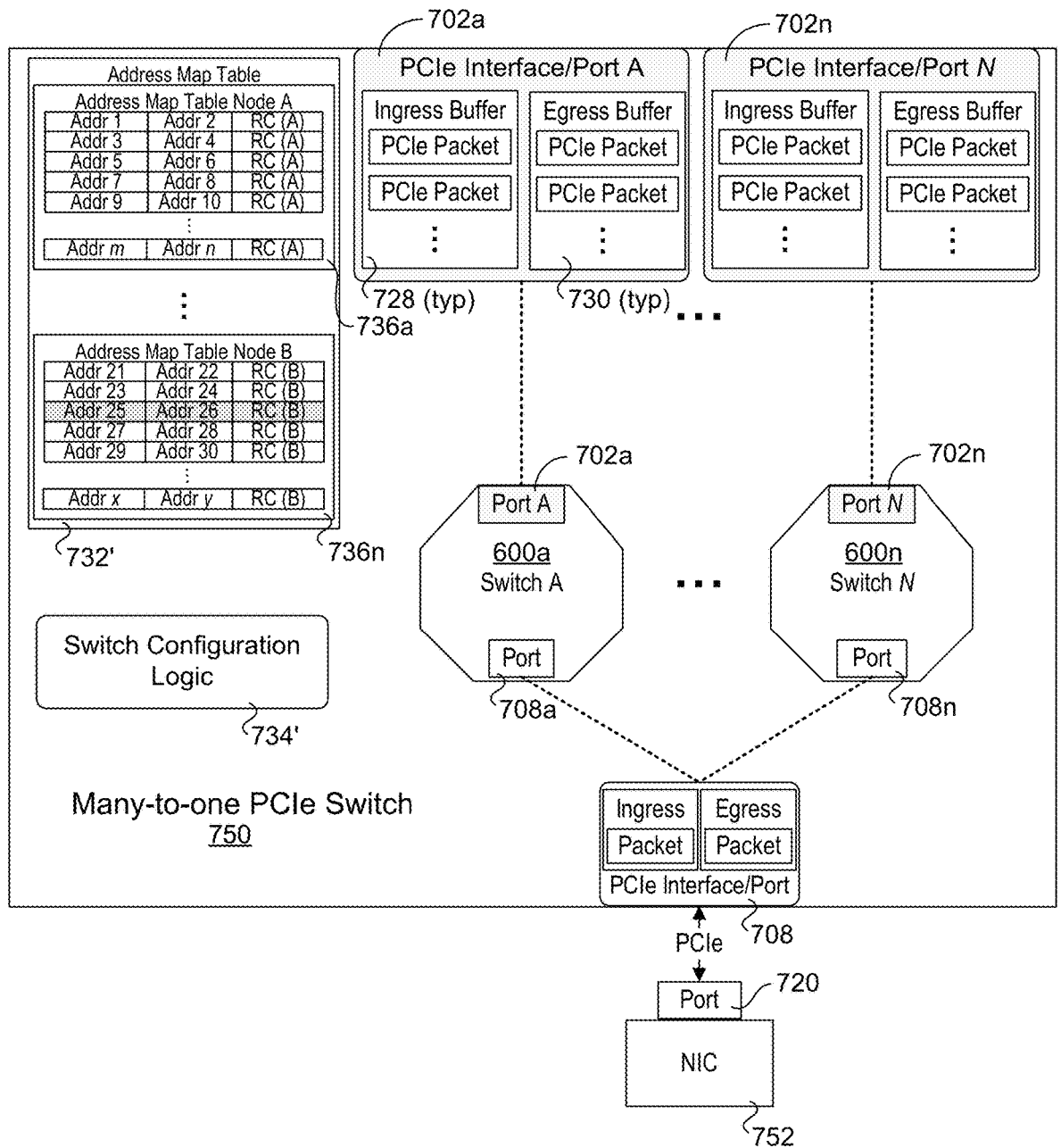
FIG. 7b is a schematic diagram illustrating internal structure and logic of a many-to-one PCIe switch, according to one embodiment.

FIG. 7b show details of a many-to-one PCIe switch 750, according to an embodiment. A many-to-one switch facilitates sharing of a single downstream peripheral device, such a NIC 752, with multiple nodes coupled to the switch at respective upstream ports, illustrated as PCIe upstream portions 702a . . . 702n and also labeled Port A . . . N, where N≥2. Each logical switch 600a . . . 600n includes an upstream port 702i and a downstream port 708i, where i=a . . . n. Each downstream port 708i is operatively coupled to a single downstream PCIe port 708. Many-to-one PCIe switch 750 also includes an address map table 732' that is depicted as including separate address maps 736a . . . 736n for NUMA nodes A . . . N, respectively, and switch configuration logic 734'.

In one embodiment, switch configuration logic 734 and 734' is configured to perform PCIe port and switch configuration operations in accordance with the PCIe hierarchy enumeration process defined by the PCIe specification. PCIe enumeration is used to discover the PCIe fabric topology, and is typically performed during system initialization. Additionally, PCIe enumeration may be performed in response to system changes, such as adding or removing as installing or removing a peripheral card from a PCIe slot or adding or removing a hot-swap module in computer systems that support hot-swap operations.

Figure 8:
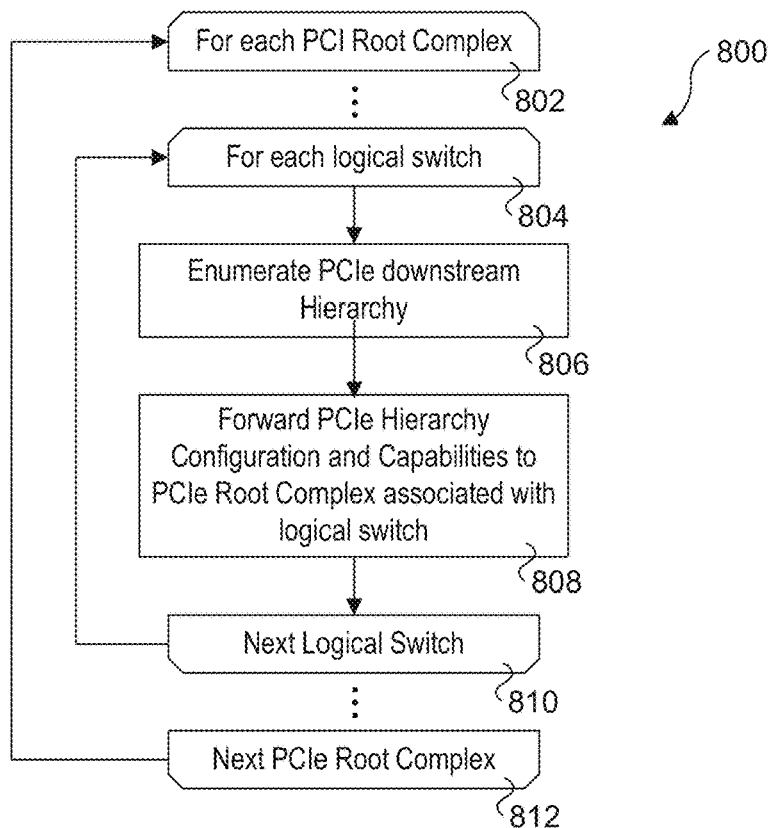
FIG. 8 is a flowchart illustrating operation and logic for enumerating PCIe hierarchies associated with a PCIe switch, according to one embodiment.

With further reference to flowchart 800 of FIG. 8, in one embodiment PCIe enumeration operations relating to NUMA architectures 300 and 300a proceeds as follows. As with conventional PCIe enumeration, the PCIe hierarchy enumeration process begins at a PCIe root complex, which is the top level entity of a PCIe hierarchy. Accordingly, flowchart 800 includes start and end loop blocks indicating the operations within the outer loop are performed for each PCIe root complex. For simplicity, each of architecture 300 and 300a only depict the PCIe interfaces of the PCIe root complexes being connected to a many-to-many PCIe switch via PCIe uplinks. However, it will be recognized that the root ports of a PCIe root complex may be connected to other PCIe entities, such as switches, buses, bridges, endpoints etc. (not shown).

As discussed above, a many-to-many PCIe switch and a many-to-one PCIe switch are implemented as multiple logical PCIe switches, with each logical PCIe switch having a single upstream port that is connected to a single PCIe root complex (either directly via the PCIe uplinks shown herein, or there may be another hierarchy layer between a logical PCIe switch upstream port and a root port of a PCIe root complex). Thus, when enumerating down the PCIe hierarchy for a given PCIe root complex, the enumeration process will encounter an upstream port associated with a logical PCIe switch. As shown by start and end loop blocks 804 and 810 for the inner loop in flowchart 800, for each logical switch the downstream hierarchy will be enumerated in a block 806 in accordance with the PCIe hierarchy process. In a block 808, the PCIe hierarchy configuration and PCIe endpoint capabilities will then be forwarded up the hierarchy to the applicable PCIe root complex using PCIe configuration messaging. This will enable each PCIe root complex to determine the configuration and capabilities of each PCIe endpoint connected to its hierarchy structure.

As noted above, a downstream port associated with a logical switch is logically connected to only a single physical downstream port on a many-to-many PCIe switch. Thus, the downstream forwarding of messages and transaction packets is fairly straightforward, as each PCIe root complex and its underlying hierarchy is operated as a separate domain. Under a conventional PCIe hierarchy, transactions originating from a given PCIe endpoint may only cause packets to be forwarded to other PCIe entities in the same hierarchy (and same domain), such as the PCIe root complex at the top of the hierarchy. Conversely, under the architectures herein employing a many-to-many PCIe switch or a many-to-one PCIe switch, since each physical downstream port may be connected to multiple logical switches, a given PCIe endpoint may forward transaction packets to multiple PCIe root complexes. As a result, additional provisions (beyond those defined in the PCIe specification) are employed for upstream packet forwarding.

In one embodiment, these additional provisions are implemented via entries in address map table 732. Each PCIe TLP packet includes a destination address. Under a DMA memory write operation that is facilitated over a PCIe link structure, the destination address at which the memory write operation is to be accessed is included in the TLP packet header. Since each address in system memory may be accessed via a single NUMA node, it is desired to route the TLP packets for a memory write transaction directly to that NUMA node, as opposed to the conventional scheme discussed above with reference to FIG. 2. In addition, depending on how a NUMA node and the software running on the node is configured, a given system memory address may only be accessed via a single PCIe root complex. Accordingly, the identity of the PCIe root complex to which the transaction packet(s) are to be forwarded is employed in some embodiments.

As shown in the table entries of address map table 732, each entry includes a first address, a second address, and a PCIe root complex identifier. Alternatively, as shown in parenthesis, the third column includes an identifier for a PCIe upstream port via which the PCIe root complex may be reached. The first and second address span an address range that is allocated to a unique (physical or virtual) instance of a PCIe endpoint, as described below. As an option, a single address may be used for some entries rather than an address range. Thus, each entry in the address map table will define an address or address range that does not overlap with any other address ranges. As a result, the destination address of the TLP packet can be used as a lookup into address map table 732, with the output being the identity of the PCIe root complex or PCIe upstream port via which the PCI root complex may be accessed for the matching table entry.

FIG. 9 shows further details of selected elements of architecture 300 and 300a in connection with performing a DMA memory write transaction that is forwarded via a many-to-many PCIe switch 700. NIC 308 includes an input port 900a coupled to a physical (PHY) interface 902a, a MAC (Media Access Channel) module 904a, packet processing logic 906a, and a DMA engine 908a. MAC module 904 includes a FIFO input buffer 910a, and a cached forwarding table map 912a.

A portion of the memory map for NUMA node A system memory 206a and node B system memory 206b is also depicted in FIG. 9. Node A system memory 206a includes an address space for an application A and an application B, which is generally illustrative of address spaces for application running on a NUMA node. Node A system memory 206a also includes a memory instance of address map table 736. Node B system memory 206b includes memory spaces allocated to NIC B driver and an application C, as well a memory instance of address map table 738. In one embodiment, the memory instances of address map tables 736 and 738 are updated in response to applicable events, while copies of these tables are cached in memory on the NICs. Optionally, only a portion of the entries in the memory instances of map tables 736 and 738 may be cached.

In recent years, virtualization of computer systems has seen rapid growth, particularly in server deployments and data centers. Under a conventional approach, a server runs a single instance of an operating system directly on physical hardware resources, such as the CPU, RAM, storage devices (e.g., hard disk), network controllers, I/O ports, etc. Under a virtualized approach, the physical hardware resources are employed to support corresponding instances of virtual resources, such that multiple Virtual Machines (VMs) may run on the server's physical hardware resources, wherein each virtual machine includes its own CPU allocation, memory allocation, storage devices, network controllers, I/O ports etc. Multiple instances of the same or different operating systems then run on the multiple VMs. Moreover, through use of a virtual machine manager (VMM) or "hypervisor," the virtual resources can be dynamically allocated while the server is running, enabling VM instances to be added, shut down, or repurposed without requiring the server to be shut down. This provides greater flexibility for server utilization, and better use of server processing resources, especially for multi-core processors and/or multi-processor servers.

Figure 10:
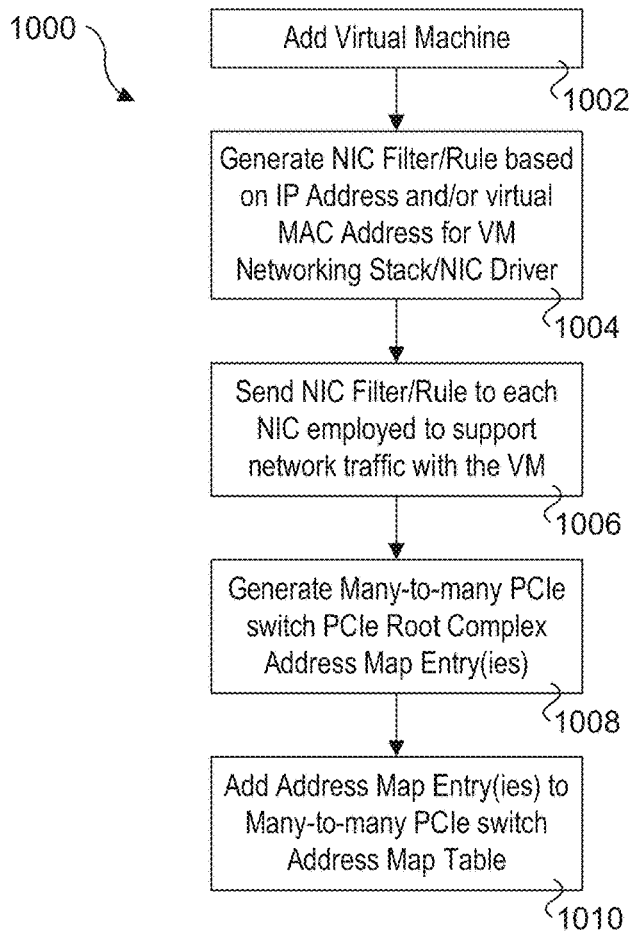
FIG. 10 is a flowchart illustrating operations performed during platform run-time to generate NIC filter/rules and address map table entries for a many-to-many PCIe switch, according to one embodiment.

FIG. 10 shows a flowchart 900 illustrating operations performed to populate forwarding table map 912 and address map tables 736 and 738 in connection with implementing a virtualized environment using NUMA node architecture such as architectures 300 and 300a. During system initialization and/or through use of a hypervisor or the like, virtual machine instances are configured and launched; the operation for adding a virtual machine is depicted in a block 1002. In conjunction with the launching of a VM, software entities corresponding that support virtual networking operations, including software for implementing a virtual network stack and a virtual network adaptor is loaded into system memory for the NUMA node hosting the VM. Under one embodiment, the virtual network adaptor will be allocated a virtual MAC address and a virtual IP (Internet Protocol) address.

As it is desired to route network traffic to applicable networking software for packet processing and handle, a mechanism is used to cause packets received at physical network ports to be forwarded to appropriate virtual networking software instances. This is generally accomplished by mapping MAC and/or IP address to network software entry points, such as an address in system memory at which a virtual NIC driver is loaded. Optionally, the mapping may be to a memory address of a physical NIC driver (employed by the platform host operating system on which the VMs are run) that is configured to forward packets to the appropriate virtual NIC driver. Accordingly, in a block 1004 NIC filters and/or rules are generated based, in part, on the IP address and/or virtual MAP addresses for the VM networking software or virtual or physical NIC driver. The NIC filter/rule is stored in system memory for the applicable NUMA node hosting the VM (not shown), and a copy of the filter/rule is sent to each NIC employed to support network traffic to the VM. This information is used to update the NIC filter/rules in the NIC's forwarding table map, such as forwarding table map 912*a* for NIC 308*a* in FIG. 9.

Generally, the NIC filter/rules are employed in connection with packet classification or pre-classification operations. In some embodiments, all or a portion of the NIC filter/rules may implement a hash function or the like to determine a match in connection with packet classification or pre-classification. In addition to performing packet classification using a hash function or the like and then using the resulting hash value as a lookup data input against a node filter lookup table, some protocols may facilitate identification of the memory address to which a packet is to be written directly. For example, for protocols such as Fiber Channel over Ethernet (FCOE) that support Direct Data Placement (DDP), there is sufficient data in the packet for the NIC to determine the desired final destination (e.g., memory address) for the packet. Accordingly, in some embodiments a node filter lookup table may include filter and/or rule data that considers a memory address that is determined during packet processing, with corresponding table entries identifying nodes and/or NICs that packet is to be forwarded to. For example, a filter column may include address range maps to corresponding nodes and/or NICs.

At this point there are filters and rules for mapping packets received at the NICs to appropriate addresses in system memory, enabling the NICs to initiate DMA memory write operations using corresponding PCIe TLP memory write transactions. However, to support forwarding of packets using a many-to-many PCIe switch, there needs to be address mapping information to route the TLP packets to the appropriate PCIe root complex. These address to PCIe root complex ID (and/or PCIe upstream port ID) mappings are generated in a block 1008 and added to address map table 732 in block 1010. In one embodiment, the mappings are generated by software entities running on each NUMA node and a copy of the address map table for that node is maintained in system memory; the address map table entries are then written to address map table 732 on many-to-many PCIe switch 700.

Figure 11:
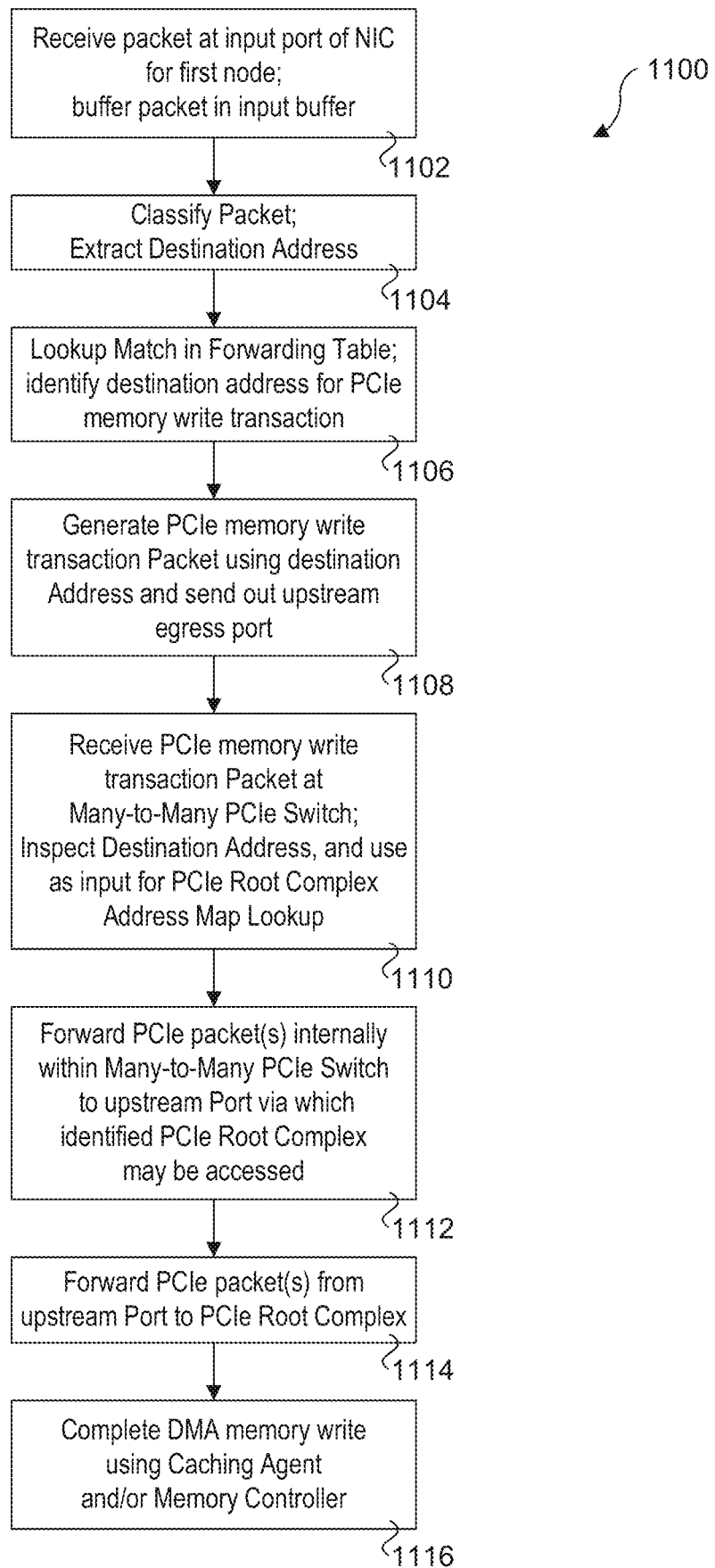
FIG. 11 is a flowchart illustrating operations relating to processing of network packets and DMA write operations in connections with the architecture of FIG. 10, according to one embodiment.

With further reference to a flowchart 1100 of FIG. 11, handling of packets received at a NIC input port proceeds as follows. First, in a block 1102, packets are received at an input port of the NIC and buffered in an input buffer. This is depicted in FIG. 9 as a packet 914 including a header 916 and a payload 918 being received at input port 900*a* and buffered in FIFO input buffer 910*a*. Next, the packet is classified by packet processing logic 906*a* and/or the destination address for the packet is extracted from packet header 916. Ethernet employs MAC addressing to route packet to ports on Ethernet NICs and Ethernet network adaptor cards with a Local Area Network (LAN). Depending on the particular type of transfer protocol being used, the packet may be forwarded using a virtual IP destination address, or a virtual MAC address. Most network traffic is forwarded using layer-3 routing, which employs IP addresses, in addition to layer-2 protocols such as Ethernet, which employ MAC addresses. Recently, layer-2 protocols have been augmented to support layer-2 forwarding across Ethernet subnets, as well as providing support for confirmed delivery (e.g., reliable transport). Accordingly, data centers and the like that are used to host some types of services may employ layer-2 routing for communication between VMs running on servers within the data center.

As depicted in a block 1106, the destination address of the network packet (IP or MAC, as applicable) is used as an input for a lookup match in forwarding table map 912*a*. Based on the destination address, the forwarding table map lookup will identify a matching entry containing the memory address to which the packet is to be DMA'ed from the NIC buffer into system memory. Accordingly, in a block 1108 a PCIe TLP memory write transaction packet is generated using the destination address corresponding to the memory address returned from the lookup and sent out the NIC's upstream port.

Up to this point, the operations in blocks 1102, 1104, 1106 and 1108 generally pertain to conventional packet handling operations, and the PCIe memory write transaction packet would be forwarded up the PCIe hierarchy to the PCIe root complex in the same domain as the NIC. However, through use of many-to-many PCIe switch 700, the PCIe memory write transaction can be forwarded to a PCIe root complex in a separate domain. This is implemented as follows.

The packet is forwarded out upstream port 718 and received at port 708 of many-to-many PCIe switch 700, as depicted by a block 1110. Upon being received, the packet is buffered in ingress buffer 728, and the PCIe packet destination address is inspected and used as a lookup for the PCIe root complex address map lookup in address map table 732. As depicted by the entry with a gray background, the address map lookup identifies the packet is to be forwarded to PCIe root complex B1 (215*b*1), or otherwise forwarded internally to PCIe upstream port B1. In accordance with a block 1112, the packet is forwarded internally within many-to-many PCIe switch 700 from the ingress buffer on port 708 to an egress buffer on PCIe upstream port 702*b*1 (B1). In a block 1114 the packet is then forwarded to PCIe root complex 215*b*1 by transmitting the packet out the egress buffer via uplink 303*b*1 to root port 604*b*1. The DMA memory write is then completed in the conventional manner in block 1116 through use of an applicable caching agent and/or memory controller 217*b*.

As discussed above, in some instance the PCIe TLP memory write destination address will correspond to a memory location specified by a memory address associated with a NIC driver (either for a physical or virtual NIC, as applicable) via a DMA write operation facilitated by DMA engine 908a and then the packet payload is copied to a memory address associated with the software consumer of the packet, depicted as software application C. Optionally, the packet payload may be copied directly to an applicable memory address allocated to the software consumer application, or to an applicable address in the LL Cache for the applicable destination Node (B).

Figure 12:
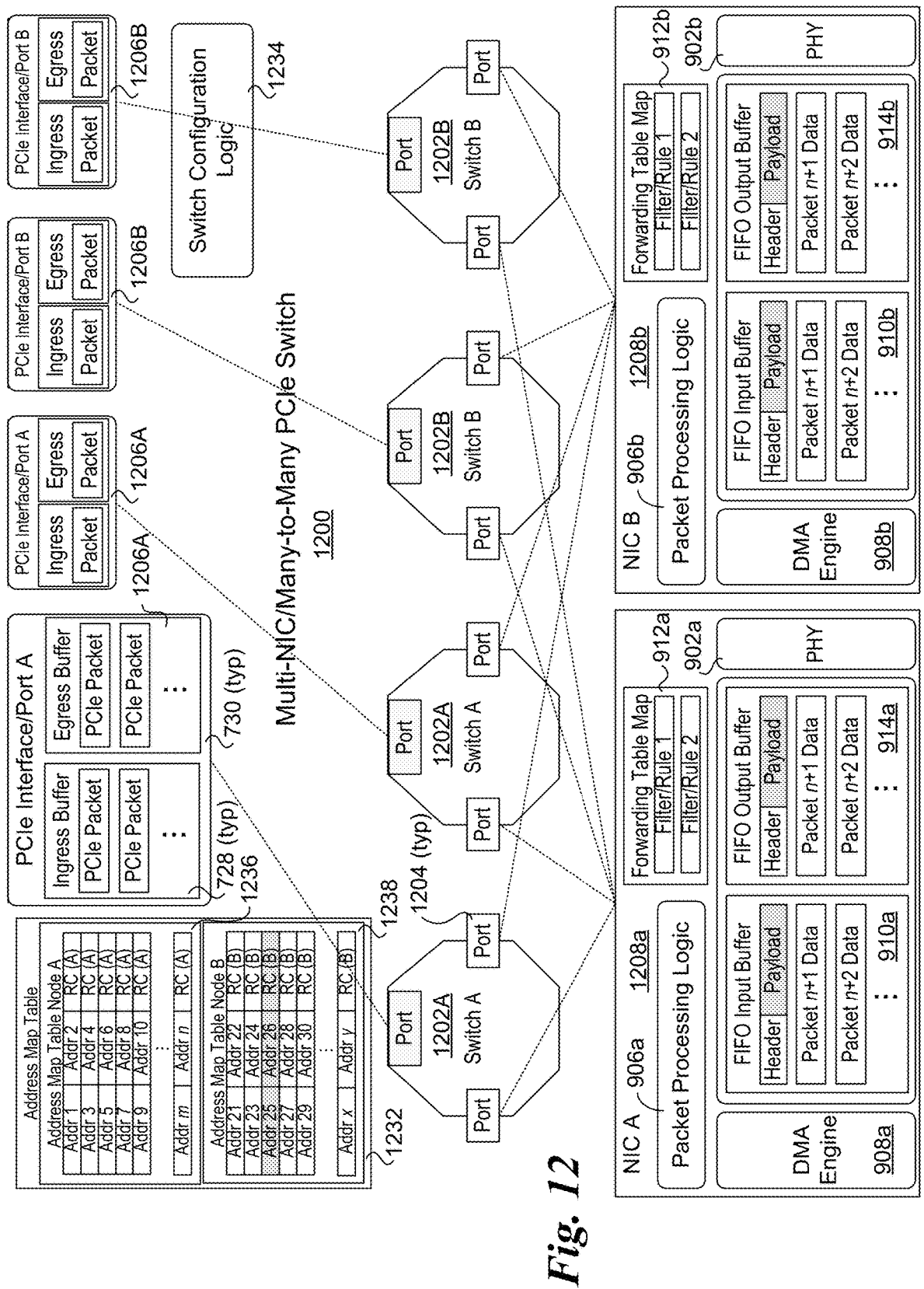
FIG. 12 is a schematic diagram of a multi-NIC/many-to-many PCIe switch, according to one embodiment.

In accordance with additional aspects of some embodiments, the functionality of a many-to-many PCIe switch and multiple NICs may be integrated together onto a single component or part, such as an integrated circuit of Intellectual Property (IP) block. An exemplary configuration for a multi-NIC/many-to-many PCIe switch 1200 is shown in FIG. 12. As illustrated, multi-NIC/many-to-many PCIe switch 1200 includes for logical PCIe switches 1202a1, 1202a2, 1202b1 and 1202b2, each having a single upstream port and a pair of downstream ports 1204. The upstream ports are respectively depicted as PCIe upstream ports 1206a1, 1206a2, 1206b1 and 1206b2 (also labeled PCIe Interface/Ports A1, A2, B1, and B2). Each of the downstream ports 1204 is communicatively coupled to each of NICs 1208a and 1208b (NICs A and B), each of which have a configuration similar to NIC 308 shown in FIG. 9, including a PHY interface 902, packet processing logic 906, a DMA engine 908, a FIFO input buffer 910, and a forwarding table map 912. Also further depicted for each NIC 308 is a FIFO output buffer 914a. In addition, multi-NIC/many-to-many PCIe switch 1200 includes an address map table 1232 including address map tables 1236 and 1238 for nodes A and B, and switch configuration logic 1234.

The architecture of FIG. 12 may be augmented to support an integrated NIC/many-to-one PCIe switch or an integrated multi-port NIC/many-to-one PCIe switch (not shown). In one embodiment, an interface to a MAC layer that is operatively coupled to the PHY layer(s) of one or multiple NIC ports is coupled to a downstream port of each logical PCIe switch.

Figure 13:
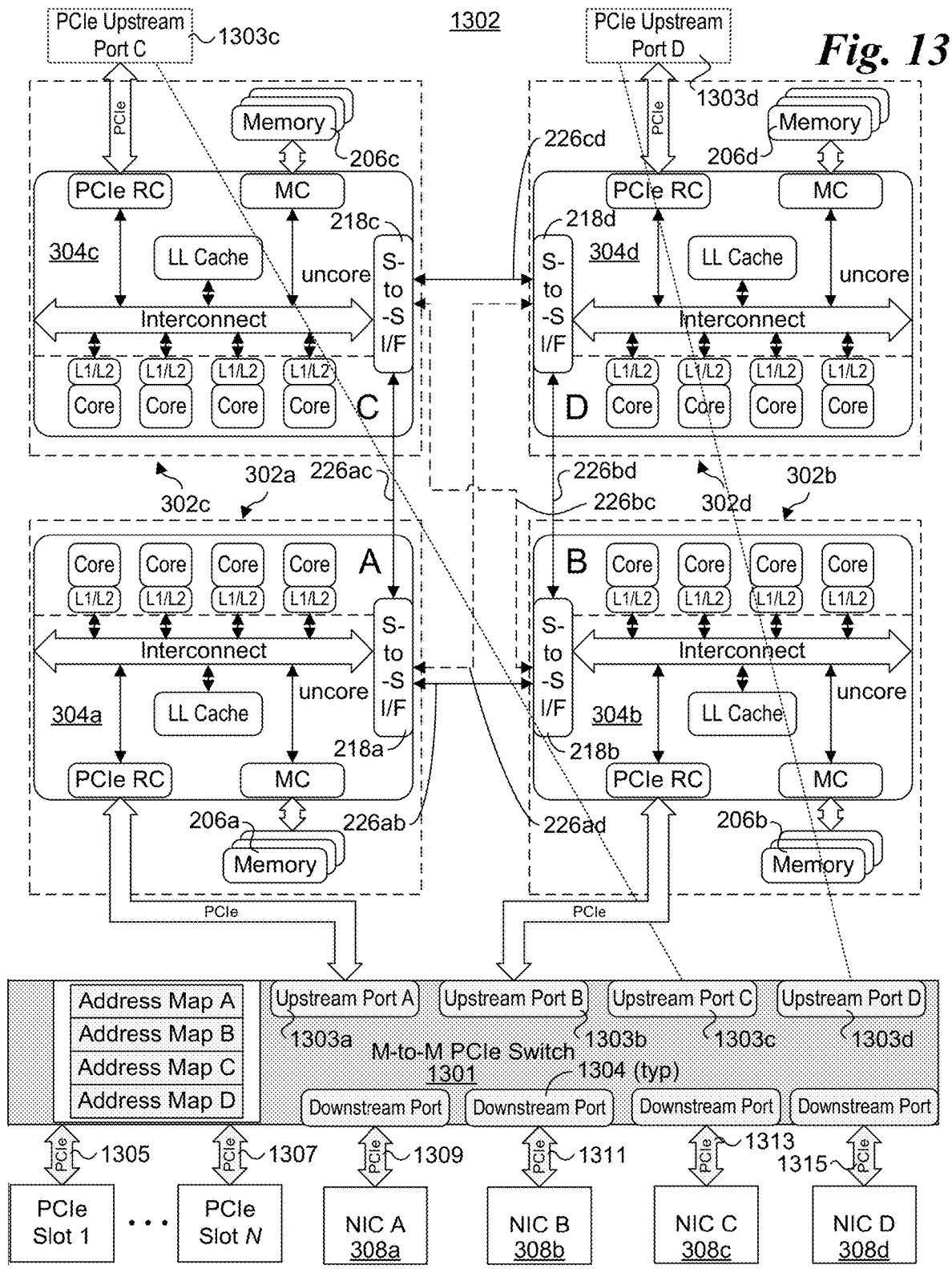
FIG. 13 is a schematic diagram of a four NUMA node architecture employing a many-to-many PCIe switch, according to one embodiment

In general, aspects of the embodiments disclosed herein may be implemented for NUMA platform architectures employing two or more nodes. An exemplary four-node NUMA platform architecture is shown in FIG. 13, including nodes 302a, 302b, 302c, and 302d, wherein each of the nodes has a similar configuration including a respective processor 304, memory 206, and NIC 309, LL Cache and PCIe root complex (for simplicity the PCIe interfaces and root ports are not shown). Although the socket-to-socket interconnect interfaces 218 on processors 304a and 304c are depicted as being mirrored with mating socket-to-socket interconnect interfaces 218 on processors 304b and 304d, it will be understood that in one embodiment processors 304a-d have similar configurations; and the use of mirroring the interfaces in FIG. 13 is used to make the interconnect routing simpler and easier to understand. Similarly, although nodes 302c and 302d are depicted as having a mirrored configuration to nodes 302a and 302b, it will be understood that this representation is merely for illustrative purposed to make the interconnects more direct.

In the platform architecture of FIG. 13, each of processors 304a-d is operatively coupled to a main board 1302 via a respective socket (not shown) or otherwise mounted to main board 1302 via an appropriate bonding scheme, such as flip-chip bounding. Optionally, the components for a given node may be mounted or otherwise operatively coupled to a daughter board, which in turn is coupled via one or more connectors to a main board. In one embodiment, main board 1302 includes wiring traces to facilitate interconnects 226xy between pairs of socket-to-socket interfaces 218, wherein x and y correspond to the respective socket nodes for the processors being linked in communication via the interconnect. For example, interconnect 226ac is an interconnect between socket-to-socket interfaces 218a and 218c. In one embodiment, there are four socket-to-socket interconnects labeled 226ac, 226cd, 226bd, and 226ab. Under an optional configuration, there are additional socket-to-socket interconnects 226ad and 226bc.

As stated above, the platform architecture of FIG. 13 includes four NICs 308a-d, which are also labeled NIC A, NIC B, NIC C, and NIC D. In addition, the platform architecture includes a plurality of PCIe slots 1-N. In general, there may be PCIe slots that are logically associated with a node, or all or a portion of the PCIe slots may be generally associated with the platform as a whole, wherein the mapping between PCIe slots and nodes is determined during platform initialization or at run-time. As described below, the platform architecture of FIG. 13 also may be used to support operation with one or more processor boards or cards removed.

The platform architecture also includes a many-to-many PCIe switch 1301 including four upstream ports 1303a, 1303b, 1303c and 1303d, and a plurality of downstream ports 1304. The downstream ports are connected to a respective PCIe slot or NIC via a PCIe interconnect, as depicted by PCIe interconnects 1305, 1307, 1309, 1311, 1313, and 1315. Many-to-many PCIe switch 1301 also is depicted as including four address maps A, B, C, and D, which are generated for VM's running on the four nodes 302a, 302b, 302c, and 302d.

Generally, the platform architecture of FIG. 13 operates in a manner similar to other embodiments discussed above, except there are now four nodes rather than two. The use of two or four nodes is not meant to be limiting, as the teachings and principles disclosed herein may be applied to a platform architecture with other numbers of nodes, and may be implemented in both NUMA and non-NUMA architectures.

Another aspect of the many-to-many peripheral switch approach is the ability to support peripheral slot and NIC connections for multi-node platforms that do not have all of their processor boards installed. For example, under some embodiments a NUMA node, or more generally a processor node may be implemented as a separate board, daughterboard, card, etc., that may be installed or removed from a platform system board or the like. Each separate board is a self-contained set of components that generally may include the components depicted for nodes 302 herein. Optionally, a multi-node platform may include a plurality of sockets in which processors 304 are installed, or processor daughterboards or the like are installed. Under the processor node board scheme, the board generally may or may not include system memory resources (e.g., one or more slots in which a memory component such as installed, or memory that is mounted to the board). Under a processor, or processor daughterboard configuration, a memory interface or controller may be provided, but the memory itself will not be included.

Figure 13A:
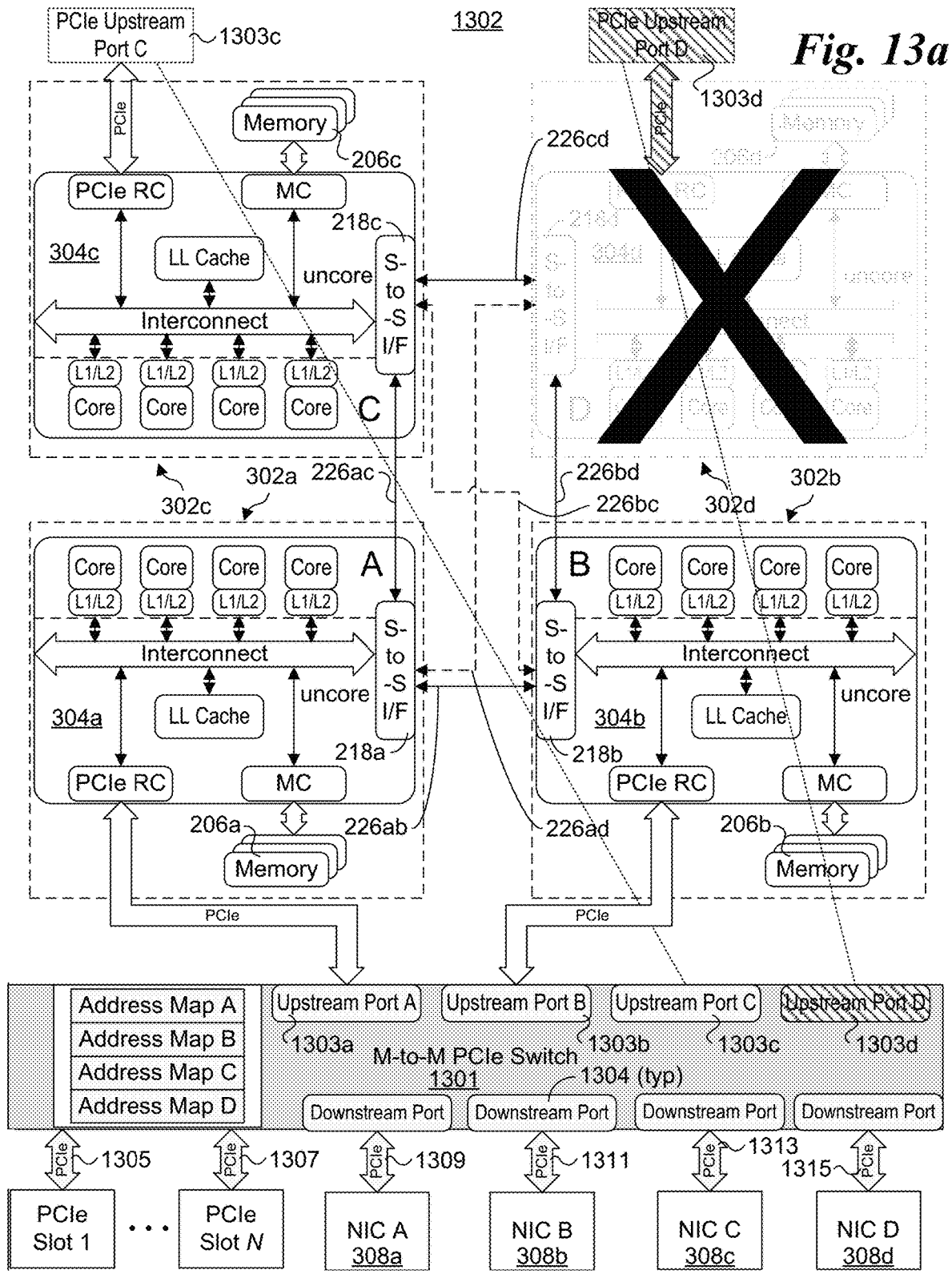
FIG. 13a is a schematic diagram of the four NUMA node architecture of FIG. 13 under which the processor node board for node D is removed.
Figure 14:
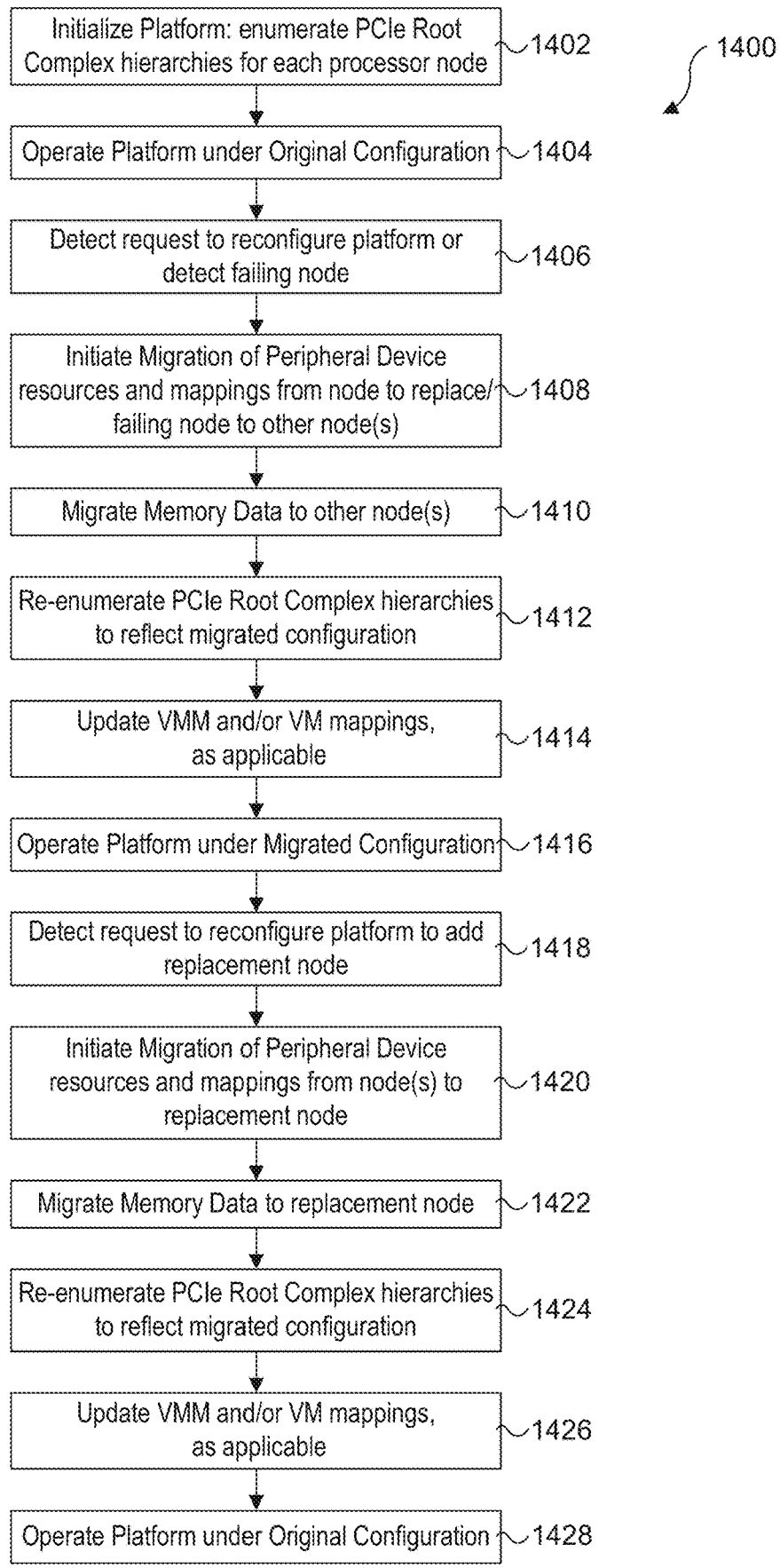
FIG. 14 is a flowchart illustrating operations performed in connection with removal and replacement of a processor node board, according to one embodiment

FIG. 13a depicts a situation in which the processor node board for node 302d has been removed, while FIG. 14 shows a flowchart 1400 illustrating operations performed in conjunction with removal and replacement of a processor node board. The platform configuration begins with each of the processor node boards being installed, corresponding to that shown in FIG. 13. As shown in a block 1402 of flowchart 1400, during initialization of the platform the PCIe root complex hierarchies are enumerated for each process node in a manner similar to that described above. During hierarchy enumeration, various of the PCIe slots and NICs will be logically associated with corresponding nodes, with corresponding peripheral address mapping data being generated by applicable software resources and employed by many-to-many PCIe switch 1301. The platform is then operated under this original configuration, as depicted in a block 1404.

During operation under the original configuration, a request to reconfigure the platform is detected in a block 1406. Optionally, the platform may be configured to detect an impending node failure, such as via detection of memory errors for processor node boards that include system memory. In response to the request for reconfiguration or the detected impending node failure, migration of peripheral device resources and mappings from the node to be replaced or failing node to one or more other nodes is initiated in a block 1408. In connection with the migration process, the memory data for the to-be-replaced/failing node is migrated to one or more other nodes. In one embodiment, a migrated peripheral-to-node configuration is determined in advance, and applicable portions of memory are migrated to appropriate node(s). For instance, for migration of a NIC, corresponding memory resources associated with operation of the NIC are migrated from an original node to a migrated node in anticipation that the NIC will employ the memory resources on the migrated node after the migration has been completed. In one embodiment, cached data for the node to be replaced is written to system memory prior to the migration, such that the data in system memory represents the current state of data for the node. In one embodiment, memory is migrated between nodes using a socket-to-socket interconnect.

Under various embodiments, a processor node board may be removed while the platform is running (e.g., during a hot-swap operation), or the system may need to be shutdown first. Under one shut-down embodiment, data in memory is written to a non-volatile storage device prior to shutdown. In one embodiment, under which system memory is external to a processor node board, an applicable voltage may be applied to the memory to preserve the memory data while other portions of the platform are shut down.

In connection with the migration, the PCIe root complex hierarchies are re-enumerated in a block 1412 to reflect the migrated configuration, and the VMM and/or VM(s) (as well as possibly other software entities) are updated to reflect the migrated configuration in a block 1414. Under a shut-down embodiment, the system is initialized following the restart to reflect the updated configuration, and system memory data is loaded from the non-volatile storage device back to memory. After the migration is complete, the platform is operated in the migrated configuration, as shown in a block 1416.

If the processor node board is to be replaced, additional operations shown in blocks 1418, 1420, 1422, 1424, 1426, and 1428 may be performed. First, in block 1418, a request to reconfigure the platform to add a replacement processor node board is detected, such as via a management console or the like. The processor node board is then installed. In one embodiment, this can be performed via a "hot-swap" operation while the platform is running. Optionally, the platform is shutdown in one of the manners described above to facilitate the first data migration.

After the processor node board has been replaced, migration of the peripheral device resources and mappings from the migrated nodes back to the original node (the one being replaced) is initiated in a block 1420. In connection with this operation, memory data is migrated back to the replacement node in block 1422, and the PCIe root complex hierarchy is re-enumerated to reflect the migrated configuration in block 1424. Additionally, applicable VMM and/or VM mappings are updated in block 1426. This returns the platform to its original configuration, under which the platform is run in a block 1428.

The foregoing embodiments provide enhanced performance over the conventional NUMA approach under which the NICs are agnostic to which node is used to access the portion of system memory corresponding to DMA memory writes addresses. Conversely, through use of a many-to-many peripheral switch or many-to-one peripheral switch, packets corresponding to peripheral device memory transactions are forwarded directly to the applicable node (via which the corresponding memory transaction may be completed), without requiring forwarding packets between nodes via socket-to-socket interconnects. This approach avoids additional processing operations and interconnect usage under the conventional approach, such as reducing QPI traffic employed needed for cache coherency. For Direct Data IO implementations, it also increases the effectiveness of DDIO since packet data may be directly written to the correct processor's last level cache.

According to aspects of some embodiments, support for NUMA node flow switching through a many-to-many peripheral switch is facilitated. Under NUMA node flow switching, NUMA node flow forwarding data is maintained that maps packet flows to the NUMA node they are to be forwarded for further processing. The packets may be received from a plurality of different network adaptor ports and/or separate network adaptors or NICs. Packet classification operations are performed at the network adaptor/NIC ports to classify packet to flows, and the packets are forwarded via the many-to-many peripheral switch to the NUMA node associated with processing the packet's flow. For example, in one embodiment that packets are assigned at flow identifier (FlowID) during a packet classification operation, while a table or the like is maintained in the many-to-many peripheral switch that maps FlowIDs to NUMA nodes (and/or to upstream ports via which the NUMA nodes can be reached). During a switch forwarding operation, the FlowID for the packet is used as a lookup into the table, and the upstream port to reach the NUMA node assigned to the flow is identified, and the switch is configured to forward the packet via that upstream port to the NUMA node.

Under some embodiments, configuration of the many-to-many and one-to-many peripheral switches may be performed in connection with platform initialization. For example, the switches may be programmed with the memory and IO ranges that are to be supported for each upstream link using BIOS, UEFI, or a bootloader when the switch devices are enumerated or by an OS-specific device driver. In addition, configuration changes may be effected during run-time operation using an OS device driver or the like.

While the embodiments depicted herein are referred to as NUMA architectures, the teachings and principles may be applied to other non-NUMA architectures under which forwarding of packets from NICS to system memory using a many-to-many peripheral switch. Generally, such architectures will include multiple nodes, each including one or more processors and/or processor cores including local caches. Under some architectures, system memory may be configured such that it is accessed in a distributed manner across nodes, wherein at least a portion of the memory is not associated with a particular node. Similarly, a last level cached or the like may be configured in a distributed manner across nodes.

The many-to-many peripheral switch and many-to-one peripheral switch forwarding functionality may be implemented in a similar manner under such non-NUMA architectures as described in the embodiments herein. Under these architectures, forwarding may be implemented via a many-to-many peripheral switch such that the packet data may be accessed by the processor or processor core running the software application that is a consumer of the packet data. Accordingly, the address map table data is configured in consideration of the location of the processor or processor core associated with a software consumer (for a given packet).

In addition to supporting connection to networks via wired Ethernet links, embodiments of the invention may be configured to support network connections via wireless links, such as via wireless connections over an IEEE 802.11-based (aka WiFi) wireless link, a WiMAX link, or various mobile telecommunication-based data links, e.g., GSM, CDMA, GPRS, W-CDMA, EDGE, CDMA2000, UMTS, HSUPA, HSDPA, EV-DO, LTE, etc. To support a wireless network link, a NIC may be configured to process corresponding radio frequency (RF) signal data. Optionally, RF signal data processing may be implemented via a separate component or components that are communicatively coupled to a NIC.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled," "operatively coupled," and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other, while "operatively coupled" may mean that two or more elements are directly or indirectly connected when a component or device is operating.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

Various aspects of the embodiments herein may be facilitated by corresponding software and/or firmware components and applications, such as software running on a server or firmware executed by an embedded processor on a network element. Thus, embodiments of this invention may be used as or to support a software program, software modules, firmware, and/or distributed software executed upon some form of processing core (such as the CPU of a computer, one or more cores of a multi-core processor), a virtual machine running on a processor or core or otherwise implemented or realized upon or within a machine-readable medium. A machine-readable medium includes any mechanism for storing or transmitting information in a form readable by a machine (e.g., a computer). For example, a machine-readable medium may include a read only memory (ROM); a random access memory (RAM); a magnetic disk storage media; an optical storage media; and a flash memory device, etc.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A many-to-many Peripheral Component Interconnect Express (PCIe) switch, comprising:
    a first plurality of PCIe ports, configurable to be coupled to host nodes via a first plurality of PCIe links;
    a second plurality of PCIe ports, configurable to be coupled to respective PCIe I/O devices via a second plurality of respective PCIe links;
    switching circuitry, configurable to selectively couple each PCIe port in the first plurality of PCIe ports to one or more PCIe ports in the second plurality of PCIe ports and to selectively couple each PCIe port in the second plurality of PCIe ports to one or more PCIe ports in the first plurality of PCIe ports; and
    one or more tables containing information for forwarding data corresponding to PCIe transactions originating from the PCIe I/O devices to host nodes based on memory address information associated with the PCIe transactions.

2. The many-to-many PCIe switch of claim 1, further configured to perform PCIe port and switch configuration operations in accordance with the PCIe hierarchy enumeration process defined by the PCIe specification.

3. The many-to-many PCIe switch of claim 1, wherein one or more of the PCIe I/O devices is a network interface controller (NIC).

4. The many-to-many PCIe switch of claim 3, wherein the many-to-many PCIe switch is configurable to receive a Direct Memory Access (DMA) write including one or more transaction layer protocol (TLP) packets corresponding to a PCIe memory write transaction initiated by a NIC coupled to the many-to-many PCIe switch and to forward the one or more TLP packets to a host node based on a destination memory address of the TLP packets.

5. The many-to-many PCIe switch of claim 1, wherein the many-to-many PCIe switch is configured to be operated in a manner that is compliant with the PCIe specification when forwarding transaction packets from a host node to a PCIe I/O device.

6. The many-to-many PCIe switch of claim 1, wherein the many-to-many PCIe switch is implemented in a single component comprising an integrated circuit.

7. The many-to-many PCIe switch of claim 1, wherein the switching circuitry is configurable to selectively couple each of the first plurality of PCIe ports to each of the second plurality of PCIe ports and to selectively couple each of the second plurality of PCIe ports to each of the first plurality of PCIe ports.

8. The many-to-many PCIe switch of claim 1, further configured to support hot-swapping of one or more of the plurality of PCIe I/O devices.

9. An apparatus comprising:
a many-to-many Peripheral Component Interconnect Express (PCIe) switch, including,
a plurality of PCIe upstream ports;
a plurality of PCIe downstream ports; and
switching circuitry, configurable to selectively couple each PCIe upstream port to one or more PCIe downstream ports and to selectively couple each PCIe downstream port to one or more PCIe upstream ports;
wherein the apparatus is configured to be installed in a system including a plurality of host nodes, each host node including a respective PCIe root complex, the system further including a plurality of PCIe Input/Output (I/O) devices,
wherein during operation of the system PCIe upstream ports are operatively coupled to host nodes via PCIe links, each PCIe I/O device is operatively coupled to a respective PCIe downstream port via a respective PCIe link between the PCIe I/O device and the PCIe downstream port, and the many-to-many PCIe switch is configured to,
receive packets from the plurality of PCIe I/O devices at the PCIe downstream ports to which the PCIe I/O devices are operatively coupled, the packets relating to PCIe transactions initiated by the PCIe I/O devices;
for at least a portion of the packets that are received,
inspect the packet to determine its destination memory address; and
forward the packet internally within the many-to-many PCIe switch from the PCIe downstream port at which the packet is received to a PCIe upstream port operatively coupled to a host node including a PCIe root complex via which the destination memory address may be reached.

10. The apparatus of claim 9, wherein the many-to-many PCIe switch is configurable to receive a Direct Memory Access (DMA) write including one or more transaction layer protocol (TLP) packets corresponding to a memory write transaction initiated by a PCIe I/O device coupled to the many-to-many PCIe switch and to forward the one or more TLP packets to a host node based on a destination memory address of the TLP packets.

11. The apparatus of claim 9, wherein the many-to-many PCIe switch is configured to be operated in a manner that is compliant with the PCIe specification when forwarding transaction packets from a host node to a PCIe I/O device.

12. The apparatus of claim 9, wherein the many-to-many PCIe switch is implemented in a single component comprising an integrated circuit.

13. The apparatus of claim 9, wherein the switching circuitry is configurable to selectively couple each of the PCIe upstream ports to each of the PCIe downstream ports and to selectively couple each of the PCIe downstream ports to each of the PCIe upstream ports.

14. The apparatus of claim 9, wherein the many-to-many PCIe switch is configured to be operated in a manner that is compliant with the PCIe specification when forwarding transaction packets from a host node to a PCIe I/O device.

15. The apparatus of claim 9, further configured to support hot-swapping of one or more of the plurality of PCIe I/O devices.

16. The apparatus of claim 9, wherein one or more of the PCIe I/O devices is a network interface controller (NIC).

17. The apparatus of claim 9, wherein the system includes at least four host nodes.

* * * * *